US012462966B2

(12) United States Patent
Takamatsu et al.

(10) Patent No.: US 12,462,966 B2
(45) Date of Patent: Nov. 4, 2025

(54) INDUCTOR COMPONENT

(71) Applicant: Murata Manufacturing Co., Ltd., Kyoto-fu (JP)

(72) Inventors: Tsuyoshi Takamatsu, Nagaokakyo (JP); Keiichi Yoshinaka, Nagaokakyo (JP); Minoru Matsunaga, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 915 days.

(21) Appl. No.: 17/581,512

(22) Filed: Jan. 21, 2022

(65) Prior Publication Data

US 2022/0238270 A1 Jul. 28, 2022

(30) Foreign Application Priority Data

Jan. 25, 2021 (JP) ................................ 2021-009560

(51) Int. Cl.
*H01F 27/28* (2006.01)
*H01F 27/29* (2006.01)

(52) U.S. Cl.
CPC . *H01F 27/2804* (2013.01); *H01F 2027/2809* (2013.01); *H01F 27/292* (2013.01)

(58) Field of Classification Search
CPC ........... H01F 27/292; H01F 2027/2809; H01F 27/2804
USPC .......................................................... 336/200
See application file for complete search history.

(56) References Cited

U.S. PATENT DOCUMENTS 9,601,259 B2 * 3/2017 Ozawa .................. H01F 27/292
9,953,759 B2 * 4/2018 Ozawa ................ H01F 17/0013
9,966,183 B2 * 5/2018 Yamauchi ........... H01F 27/2804
2010/0253464 A1 * 10/2010 Miyoshi .............. H01F 17/0013 336/200
2015/0130021 A1 * 5/2015 Kim .................... H01F 17/0013 438/381
2019/0122808 A1 * 4/2019 Jo ....................... H01F 17/0013

FOREIGN PATENT DOCUMENTS

CN 111986879 A 11/2020
JP 2004087596 A * 3/2004
JP 2015-015297 A 1/2015
JP 2016189451 A * 11/2016

(Continued)

*Primary Examiner* — Shawki S Ismail
*Assistant Examiner* — Joselito S. Baisa
(74) *Attorney, Agent, or Firm* — Studebaker Brackett PLLC

(57) ABSTRACT

An inductor component comprising an element body; a coil disposed in the element body; and a first external electrode and a second external electrode disposed on the element body and electrically connected to the coil. The coil has a helical structure in which the coil is wound while proceeding along an axis such that the axis is parallel to a bottom surface of the element body and intersects with first and second side surfaces of the element body. The coil includes coil wirings laminated along the axis and wound along a plane, and a via wiring connecting the coil wirings. The first coil wiring is on a central side in the axial direction of the coil relative to the second coil wiring, and a first pad part of the first coil wiring is adjacent to a second wiring part of the second coil wiring in the axial direction.

20 Claims, 18 Drawing Sheets

(56) References Cited

FOREIGN PATENT DOCUMENTS

| | | | | | |
|---|---|---|---|---|---|
| JP | 2019186696 A | * | 10/2019 | ............... | H01G 4/30 |
| JP | 2022064179 A | * | 4/2022 | ......... | H01F 17/0013 |
| WO | WO-2013103044 A1 | * | 7/2013 | ........... | H01F 27/292 |
| WO | WO-2015073295 A1 | * | 5/2015 | ......... | H01F 17/0013 |

* cited by examiner

INDUCTOR COMPONENT

CROSS REFERENCE TO RELATED APPLICATION

This application claims benefit of priority to Japanese Patent Application 2021-009560, filed Jan. 25, 2021, the entire content of which is incorporated herein by reference.

BACKGROUND

Technical Field

The present disclosure relates to an inductor component

Background Art

A conventional inductor component is described in Japanese Laid-Open Patent Publication No. 2015-015297. This inductor component includes an element body and a coil disposed in the element body. The coil has multiple coil wirings laminated along the axis of the coil and via wirings connecting the multiple coil wirings. The coil wiring has a wiring part and a pad part disposed at an end portion of the wiring part and connected to the via wiring.

SUMMARY

In the connection between the coil wiring and the via wiring, it is necessary to ensure an area of contact of the via wiring with the coil wiring (i.e., the cross-sectional area of the via wiring) so as to prevent the via wiring from peeling off from the coil wiring. Additionally, considering a deviation of a position of connection of the via wiring to the coil wiring and a variation in the size of the via wiring, it is necessary to increase the area of the pad part connected to the via wiring.

The pad part is typically projected toward the inner circumferential side of the coil (hereinafter referred to as the inside of the coil) relative to the wiring part when viewed in the axial direction of the coil. In addition, typically, when viewed in the axial direction of the coil, the center of the pad part and the center of the via wiring are often closer to the inside of the coil than the center of the wiring part. This is because if the pad part is projected toward the outer circumferential side of the coil (hereinafter referred to as the outside of the coil) relative to the wiring part, a dimensional margin for manufacturing the element body outside the coil becomes smaller, so that the diameter of the coil needs to be reduced. As described above, conventionally, the pad part significantly protrudes toward the inside of the coil relative to the wiring part.

The inventor of the present application focused on the fact that the pad part protruding toward the inside of the coil interferes with a magnetic flux flowing inside the coil. It was found that the loss of the magnetic flux increases due to the interference with the flow of the magnetic flux of the coil, which lowers the acquisition efficiency of the L value and lowers the Q value. Particularly, when the inductor component becomes small, the width of the wiring part becomes smaller, while the areas of the via wiring and the pad part cannot be made smaller due to the necessity of ensuring the reliability of connection of the via wiring to the coil wiring, and the amount of protrusion of the pad part becomes larger, further interfering with the magnetic flux flow of the coil.

Therefore, the present disclosure provides an inductor component reducing interference with a flow of a coil magnetic flux.

That is, an aspect of the present disclosure provides an inductor component comprising an element body; a coil disposed in the element body; and a first external electrode and a second external electrode disposed on the element body and electrically connected to the coil. The element body includes a first end surface and a second end surface opposite to each other, a first side surface and a second side surface opposite to each other, and a bottom surface connected between the first end surface and the second end surface and between the first end surface and the second end surface, and a top surface opposite to the bottom surface. The coil has a helical structure in which the coil is wound while proceeding along an axis such that the axis is parallel to the bottom surface of the element body and intersects with the first side surface and the second side surface. The coil includes multiple coil wirings laminated along the axis and each wound along a plane, and a via wiring connecting the multiple coil wirings. The coil wirings include a wiring part extending along a plane and a pad part disposed at an end portion of the wiring part and connected to the via wiring. Also, in the first coil wiring and the second coil wiring adjacent to each other in the axial direction, the first coil wiring is located on a central side in the axial direction of the coil relative to the second coil wiring, and a first pad part of the first coil wiring is adjacent to a second wiring part of the second coil wiring in the axial direction, and when viewed in the axial direction, a protrusion amount of the first pad part from the second wiring part to the inside of the coil is 1.4 times or less of a width dimension of the second wiring part.

The protrusion amount of the first pad part refers to a maximum value of protrusion of the first pad part from the second wiring part when viewed in the axial direction in terms of the portion of the second wiring part adjacent to the first pad part. The width dimension of the second wiring part refers to a dimension in the width direction orthogonal to the extending direction of the second wiring part when viewed in the axial direction. The protrusion amount of the first pad part being 1.4 times or less of the width dimension of the second wiring part includes the case that the protrusion amount of the first pad part is zero (0) or minus (−). Therefore, this includes not only the case that the first pad part protrudes from the second wiring part, but also the case that the first pad part does not protrudes from the second wiring part, and that a tip of the protrusion of the first pad part to the inside of the coil is located on the outside of the coil relative to a tip of the second wiring part on the inside of the coil.

According to the embodiment, since the protrusion amount of the first pad part is 1.4 times or less of the width dimension of the second wiring part, the magnetic flux flowing inside the coil is less interfered with by the first pad part and the loss of the magnetic flux is reduced, so that the acquisition efficiency of the L value can be improved, and the decrease of the Q value can be suppressed.

Preferably, in one embodiment of the inductor component, a length of the via wiring in an extending direction of the coil wiring is longer than a length of the via wiring in a width direction of the coil wiring.

According to the embodiment, the via wiring is formed so that the length of the coil wiring in the extending direction becomes longer than the length of the coil wiring in the width direction. For example, the shape of the via wiring is rectangular, elliptical, or oval. Therefore, the contact area of the via wiring for the coil wiring (i.e., the cross-sectional area of the via wiring) can be ensured, and the connection reliability of the via wiring for the coil wiring 21 can be ensured Preferably, in one embodiment of the inductor component, a size of the inductor component in a direction parallel to the bottom surface and perpendicular to the axis is less than 0.7 mm, and a size of the inductor component in a direction parallel to the axis is less than 0.4 mm.

According to the embodiment, even if the inductor component is reduced in size, the interference with the magnetic flux of the coil can effectively be reduced.

Preferably, in one embodiment of the inductor component, the protrusion amount is 21 μm or less.

According to the embodiment, the magnetic flux is hardly blocked by the pad part.

Preferably, in one embodiment of the inductor component, the center of the first pad part is located at the center in the width direction of the second wiring part when viewed in the axial direction.

According to the embodiment, the magnetic flux is hardly blocked by the pad part.

Preferably, in one embodiment of the inductor component, the radius of the first pad part is 18 μm or less when viewed in the axial direction.

According to the embodiment, the magnetic flux is hardly blocked by the pad part.

Preferably, in one embodiment of the inductor component, the center of the first pad part is located at the center in the width direction of the second wiring part when viewed in the axial direction, and the radius of the first pad part is 18 μm or less.

According to the embodiment, the magnetic flux is hardly blocked by the pad part.

Preferably, in one embodiment of the inductor component, the protrusion amount is 10.5 μm or less.

According to the embodiment, the magnetic flux is hardly blocked by the pad part.

Preferably, in one embodiment of the inductor component, the diameter of the first pad part is equal to the width dimension of the second wiring part when viewed in the axial direction.

According to the embodiment, the magnetic flux is hardly blocked by the pad part.

Preferably, in one embodiment of the inductor component, the inner diameter of the coil increases from the center in the axial direction of the coil toward both ends.

The inner diameter of the coil increases continuously or stepwise.

According to the embodiment, since the inner diameter of the coil increases from the center in the axial direction of the coil toward both ends, the flow of the magnetic flux is less interfered with at both ends of the coil. As a result, the loss at both ends of the coil can be reduced, and the decrease of the Q value can be suppressed.

Preferably, in one embodiment of the inductor component, in at least two coil wirings of all the coil wirings, the inner diameter of one coil wiring of the two coil wirings adjacent to each other in the axial direction is larger than the inner diameter of the other coil wiring, and when viewed in the axial direction, a deviation width between an inner surface of the one coil wiring and an inner surface of the other coil wiring is 1 μm or more and 4 μm or less (i.e., from 1 μm to 4 μm).

The inner diameter of the coil wiring refers to the inner diameter of the wiring part of the coil wiring. The inner surface of the coil wiring refers to the inner surface of the wiring part of the coil wiring. The deviation width may not be constant along the extending direction of the same coil wiring.

According to the embodiment, the deviation width between the inner surface of the one coil wiring and the inner surface of the other coil wiring is 1 μm or more and 4 μm or less (i.e., from 1 μm to 4 μm), so that the inner surface of the coil wiring can easily be arranged along the magnetic flux, and the flow of the magnetic flux is hardly interfered with on the inner surface of the coil wiring.

Preferably, in one embodiment of the inductor component, in all the coil wirings, the inner diameter of the one coil wiring is larger than the inner diameter of the other coil wiring, and when viewed in the axial direction, a deviation width between an inner surface of the one coil wiring and an inner surface of the other coil wiring is 1 μm or more and 4 μm or less (i.e., from 1 μm to 4 μm)

According to the embodiment, the inner surfaces of all the coil wirings are easily arranged along the magnetic flux, and the flow of the magnetic flux is less likely to be interfered with on the inner surfaces of the coil wirings.

Preferably, in one embodiment of the inductor component, regarding the deviation width, the deviation width in the direction intersecting with the first end surface and the second end surface in a portion of the coil wiring extending in a direction intersecting with the top surface and the bottom surface is larger than the deviation width in the direction intersecting with the top surface and the bottom surface in a portion of the coil wiring extending in a direction intersecting with first end surface and the second end surface.

According to the embodiment, the size of the element body in the direction intersecting with the first end surface and the second end surface intersect is usually larger than the size of the element body in the direction intersecting with the top surface and the bottom surface. Also, the element body has a margin in the space for extending the portion of the coil wiring extending in the direction intersecting with first end surface and the second end surface as compared to the space for extending the portion of the coil wiring extending in the direction intersecting with the top surface and the bottom surface. Therefore, the deviation width can be made larger in the direction intersecting with the first end surface and the second end surface in the portion of the coil wiring extending in the direction intersecting with the top surface and the bottom surface.

Preferably, in one embodiment of the inductor component, the width dimension of the wiring part of all the coil wirings is the same, the first coil wiring corresponds to a portion having a small inner diameter of the coil, and when viewed in the axial direction, the protrusion amount from the second wiring part of the first pad part to the outside of the coil is greater than or equal to the protrusion amount from the second wiring part of the first pad part to the inside of the coil.

According to the embodiment, since a side gap on the radial outside of the first coil wiring is wider than a side gap on the radial outside of the coil wiring corresponding to a portion having a large inner diameter of the coil, and therefore, even if the first pad part is shifted to the side gap on the outside of the first coil wiring, the constant side gap can be ensured on the radial outside of the entire coil. Since the side gap can be ensured in this way, it is not necessary to reduce the diameter of the coil or increase the size of the element body.

Additionally, by simply shifting the first pad part to the side gap on the outside of the first coil wiring, the protrusion amount of the first pad part to the inside of the coil can easily be reduced, and furthermore, the cross-sectional area of the first pad part and the cross-sectional area of the via wiring can be ensured, so that the connection reliability of the via wiring for the coil wiring can be ensured.

Preferably, in one embodiment of the inductor component, the first coil wiring corresponds to a portion having the smallest inner diameter of the coil.

According to the embodiment, the side gap on the radial outside of the first coil wiring is the widest among the side gaps on the outside of the entire coil. Therefore, even if the first pad part is shifted to the side gap on the outside of the first coil wiring, the side gap on the outside of the entire coil can more reliably be ensured.

Preferably, in one embodiment of the inductor component, the first external electrode is formed from the first end surface to the bottom surface, the second external electrode is formed from the second end surface to the bottom surface, and the first pad part is located on the top surface side relative to the bottom surface side.

According to the embodiment, even if the first pad part is shifted to the side gap on the outside of the first coil wiring on the top surface side, the side gap on the outside of the entire coil can be ensured. Specifically, although it is difficult to ensure the side gap on the outside of the coil on the top surface side as compared to the bottom surface side since the external electrodes do not exist, the side gap on the outside of the coil can be ensured on the top surface side by achieving the configuration described above.

Preferably, in one embodiment of the inductor component, in the coil wiring located on the outer side in the axial direction among all the coil wirings, the pad part is located on the bottom surface side relative to an end edge on the top surface side of the first external electrode and an end edge on the top surface side of the second external electrode when viewed in the axial direction.

According to the embodiment, although the inner diameter of the coil wirings located on the outer side in the axial direction becomes large, the pad part is located on the bottom surface side relative to the end edge on the top surface side of the first external electrode and the end edge on the top surface side of the second external electrode, so that even if the protrusion of the pad part is shifted to the outside of the coil, an influence on the side gap of the entire coil is small, and the protrusion of the pad part to the inside of the coil can effectively be reduced.

According to the inductor component of an aspect of the present disclosure, the interference with the flow of the coil magnetic flux is reduced.

DETAILED DESCRIPTION

An inductor component of an aspect of the present disclosure will now be described in detail with reference to shown embodiments. The drawings include schematics and may not reflect actual dimensions or ratios.

First Embodiment

Figure 1:
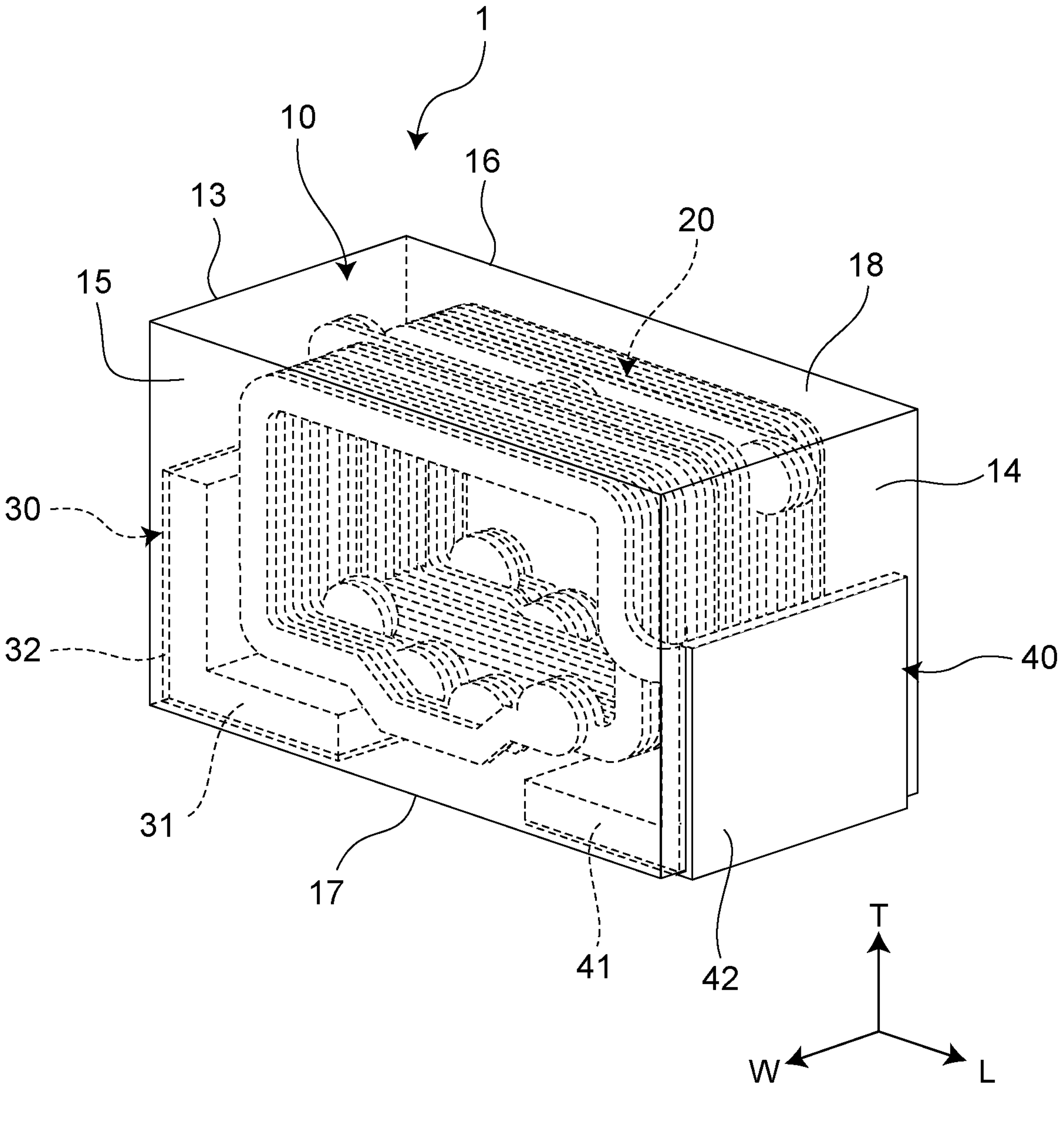
FIG. 1 is a perspective view showing a first embodiment of an inductor component.
Figure 2:
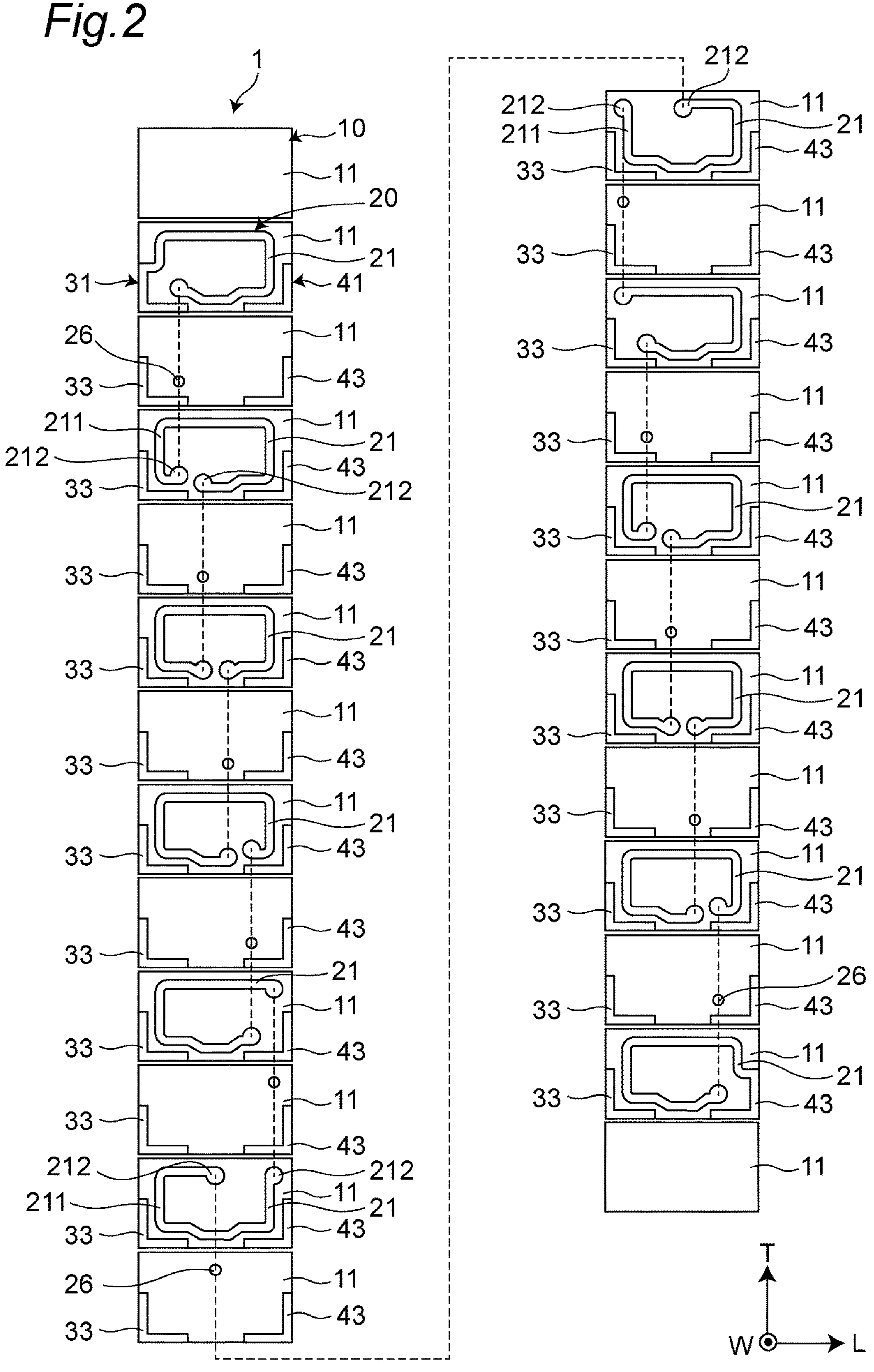
FIG. 2 is an exploded view of the inductor component.
Figure 3:
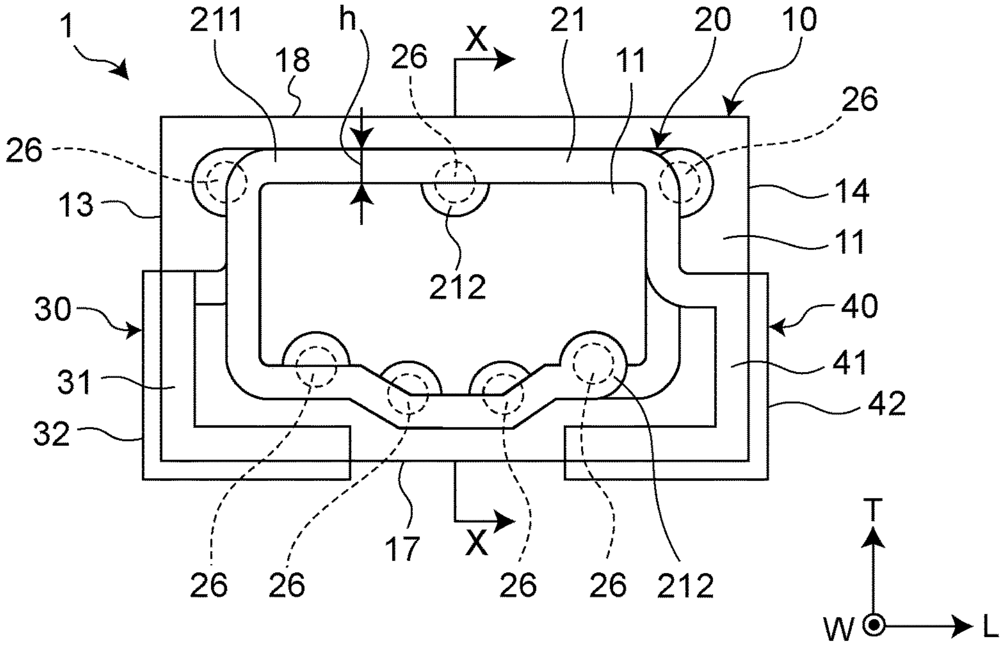
FIG. 3 is a perspective front view from a first side surface side of the inductor component.
Figure 4:
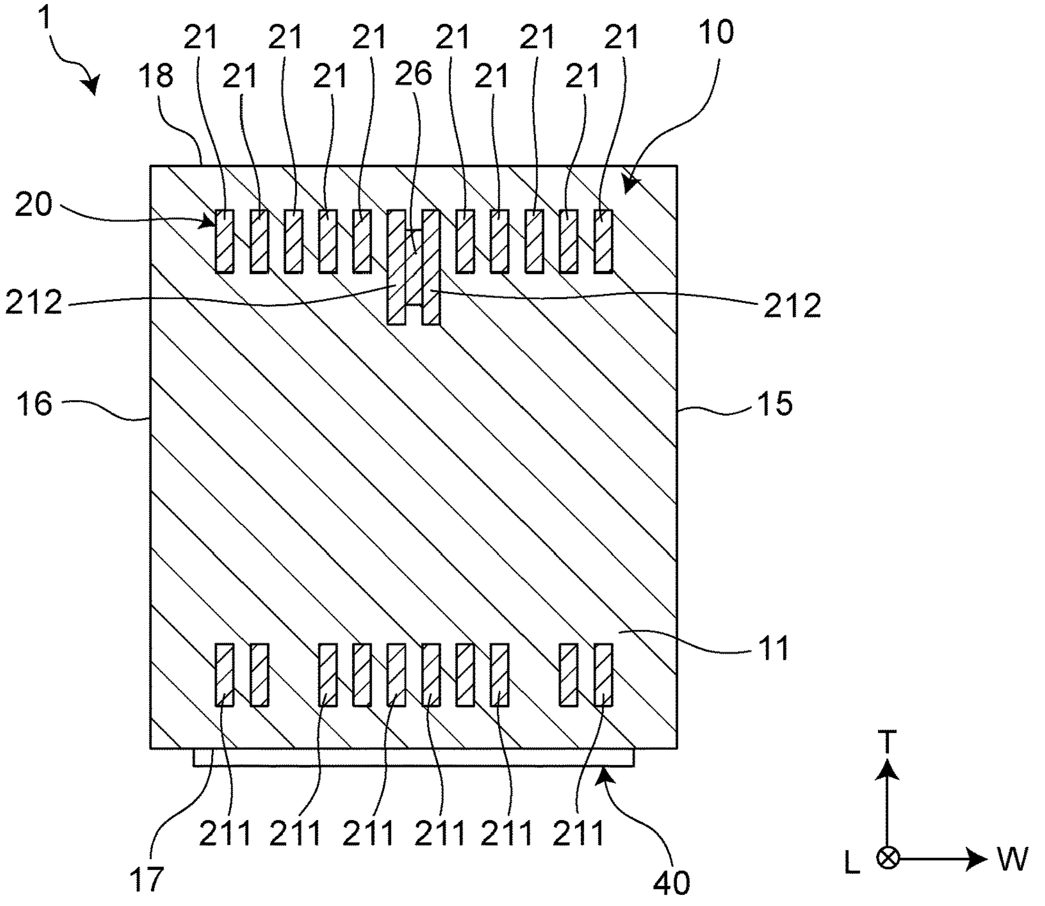
FIG. 4 is a cross-sectional view taken along a line X-X of FIG. 3.

FIG. 1 is a perspective view showing a first embodiment of an inductor component. FIG. 2 is an exploded view of the inductor component. FIG. 3 is a perspective front view from a first side surface side of the inductor component. FIG. 4 is a cross-sectional view taken along a line X-X of FIG. 3.

As shown in FIGS. 1 to 4, the inductor component 1 includes an element body 10, a coil 20 disposed in the element body 10, and a first external electrode 30 and a second external electrode 40 disposed on the element body 10 and electrically connected to the coil.

The inductor component 1 is electrically connected via the first and second external electrodes 30, 40 to a wiring of a circuit board not shown. The inductor component 1 is used as an impedance matching coil (matching coil) of a high-frequency circuit, for example, and is used for an electronic device such as a personal computer, a DVD player, a digital camera, a TV, a portable telephone, automotive electronics, and medical/industrial machinery. However, the inductor component 1 is not limited to these uses and is also usable for a tuning circuit, a filter circuit, and a rectifying/smoothing circuit, for example.

The element body 10 is formed by laminating multiple insulating layers 11. The insulating layers 11 are made of a magnetic material or a non-magnetic material. Examples of the magnetic material include ferrite etc., and examples of the non-magnetic material include glass, alumina, resin, etc. The multiple insulating layers 11 are laminated in a W direction. The insulating layer 11 has a layer shape extending in an L-T plane orthogonal to the lamination direction in the W direction. In the multiple insulating layers 11, an interface between two adjacent insulating layers 11 may not be clear due to firing etc.

The element body 10 is formed in a substantially rectangular parallelepiped shape. The element body 10 has a first end surface 13 and a second end surface 14 opposite to each other, a first side surface 15 and a second side surface 16 opposite to each other, and a bottom surface 17 connected between the first end surface 13 and the second end surface 14 and between the first end surface 15 and the second end surface 16, and a top surface 18 opposite to the bottom surface 17. Therefore, the outer surface of the element body 10 is made up of the first end surface 13, the second end surface 14, the first side surface 15, the second side surface 16, the bottom surface 17, and the top surface 18.

As shown in FIG. 1, an L direction is a direction perpendicular to the first end surface 13 and the second end surface 14, and the W direction is a direction perpendicular to the first side surface 15 and the second side surface 16, a T direction is a direction perpendicular to the bottom surface 17 and the top surface 18. The L direction, the W direction, and the T direction are orthogonal to each other. In FIG. 2, the insulating layer 11 located on the lowermost side in the figure corresponds to the first side surface 15, and the insulating layer 11 located on the uppermost side corresponds to the second side surface 16.

The coil 20 has a helical structure in which the coil is wound while proceeding along an axis such that the axis is parallel to the bottom surface 17 of the element body 10 and intersects with the first side surface 15 and the second side surface 16 of the element body 10. The axis of the coil is parallel to the W direction. The coil 20 contains Ag. The coil 20 may contain a conductive material other than Ag (e.g., Cu, Au) or glass.

Although the coil 20 is formed in a substantially oval shape when viewed in an axial direction, the present disclosure is not limited to this shape. The shape of the coil 20 may be circular, elliptical, rectangular, or other polygonal shapes, for example. The axial direction of the coil 20 refers to a direction parallel to the central axis of the helix formed by winding the coil 20. The axial direction of the coil 20 and the lamination direction of the insulating layers 11 are the same direction. As used herein, the term "parallel" refers not only to a strictly parallel relationship but also to a substantially parallel relationship in consideration of a realistic variation range.

The coil 20 includes multiple coil wirings 21 each wound along a plane and via wirings 26 connecting the multiple coil wirings 21. The multiple coil wirings 21 are laminated along the axial direction. The coil wirings 21 are formed by being wound on principal surfaces (L-T planes) of the insulating layers 11 orthogonal to the axial direction. The number of turns of the coil wiring 21 is less than one lap or may be one lap or more. The via wirings 26 penetrate the insulating layers 11 in the thickness direction (W direction). The coil wirings 21 adjacent to each other in the lamination direction are electrically connected in series via the via wirings 26. In this way, the multiple coil wirings 21 form a helix while being electrically connected in series to each other. However, all the coil wirings 21 are not required to be electrically connected in series, and some or all of the coil wirings 21 may be electrically connected in parallel.

The coil wiring 21 has a wiring part 211 extending along a plane and a pad part 212 disposed at an end portion of the wiring part 211 and connected to the via wiring 26. A portion of the pad part 212 protrudes to the inside of the coil 20 relative to the wiring part 211 when viewed in the axial direction. As shown in FIG. 4, these pad parts 212 do not protrude to the outside of the coil 20 relative to the wiring part 211 when viewed in the axial direction, and the pad part 212 and the wiring part 211 are substantially flush with each other for a tip on the outside of the coil 20. The pad part 212 is circular. The diameter of the pad part 212 is larger than a width dimension h of the wiring part 211. The width dimension h of the wiring part 211 is a dimension in the width direction orthogonal to the extending direction of the wiring part 211 when viewed in the axial direction.

Figure 5:
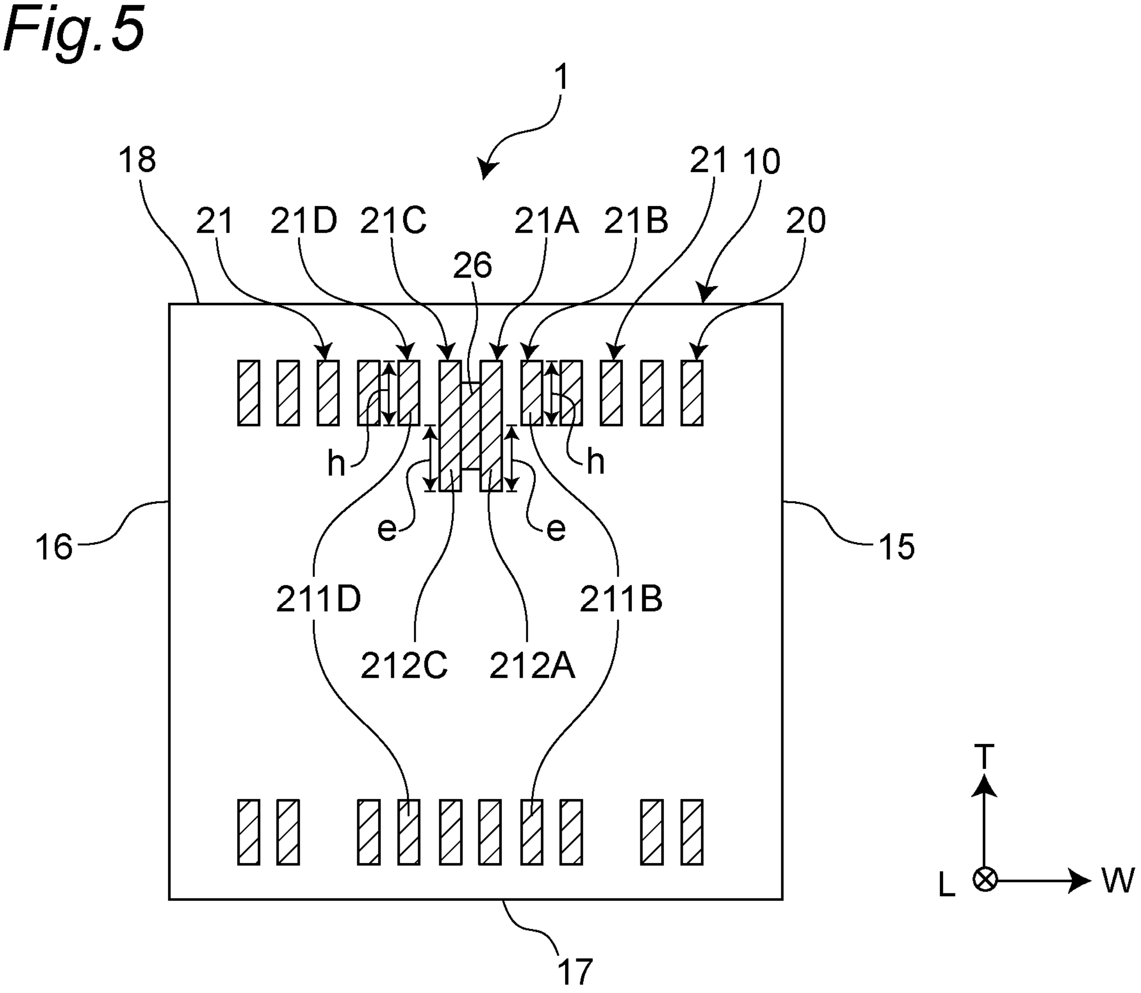
FIG. 5 is a simplified view of FIG. 4.

FIG. 5 is a simplified view of FIG. 4. As shown in FIG. 5, between a first coil wiring 21A and a second coil wiring 21B adjacent to each other in the axial direction (W direction), the first coil wiring 21A is located on the central side in the axial direction of the coil 20 relative to the second coil wiring 21B. The center in the axial direction of the coil 20 refers to the center of the length in the axial direction of the coil 20 and corresponds to the position of the via wiring 26 shown in FIG. 5 in the W direction.

In FIG. 5, among all the coil wirings 21, the coil wirings 21 corresponding to the center in the axial direction of the coil 20 refer to the first coil wiring 21A and a third coil wiring 21C on both sides of the via wiring 26 actually located in the center in the axial direction. This is because the number of layers of the coil wirings 21 is twelve, which an even number, so that two layers of the coil wirings 21 corresponding to the center in the axial direction exist. On the other hand, when the number of layers of the coil wiring 21 is an odd number, the coil wiring 21 corresponding to the center in the axial direction is one layer, and the coil wiring 21 practically corresponds to the center of the length in the axial direction of the coil 20.

A first pad part 212A of the first coil wiring 21A is adjacent to a second wiring part 211B of the second coil wiring 21B in the axial direction. When viewed in the axial direction that is the W direction of FIG. 5, a protrusion amount e of the first pad part 212A from the second wiring part 211B to the inside of the coil 20 is 1.4 times or less of the width dimension h of the second wiring part 211B. The protrusion amount e of the first pad part 212A refers to the maximum value of the protrusion of the first pad part 212A from the second wiring part 211B when viewed in the axial direction in terms of the portion of the second wiring part 211B adjacent to the first pad part 212A.

According to the configuration described above, since the protrusion amount e of the first pad part 212A is 1.4 times or less of the width dimension h of the second wiring part 211B, the magnetic flux flowing inside the coil 20 is less interfered with by the first pad part 212A and the loss of the magnetic flux is reduced, so that the acquisition efficiency of the L value can be improved, and the decrease of the Q value can be suppressed.

Similarly, as shown in FIG. 5, between the third coil wiring 21C and a fourth coil wiring 21D, the third coil wiring 21C is located on the central side in the axial direction of the coil 20 relative to the to the fourth coil wiring 21D. The third coil wiring 21C is connected to the first coil wiring 21A via the via wiring 26 shown in the figure. A third pad part 212C of the third coil wiring 21C is adjacent to a fourth wiring part 211D of the fourth coil wiring 21D in the axial direction. When viewed in the axial direction, the protrusion amount e of the third pad part 212C from the fourth wiring part 211D to the inside of the coil 20 is 1.4 times or less of the width dimension h of the fourth wiring part 211D.

According to the configuration described above, since the protrusion amount e of the third pad part 212C is 1.4 times or less of the width dimension h of the fourth wiring part 211D, the magnetic flux flowing inside the coil 20 is less interfered with by the third pad part 212C and the loss of the magnetic flux is reduced, so that the acquisition efficiency of the L value can be improved, and the decrease of the Q value can be suppressed.

Similarly, among the other coil wirings 21 other than the first to fourth coil wirings 21A to 21D, the pad part of one coil wiring 21 located on the central side in the axial direction of the coil wirings 21 adjacent to each other in the axial direction is adjacent to the wiring part of the other coil wiring 21 in the axial direction and, when viewed in the axial direction, the protrusion amount e of the pad part 212 of the one coil wiring 21 from the wiring part 211 of the other coil wiring 21 to the inside of the coil 20 is 1.4 times or less of the width dimension h of the wiring part 211 of the other coil wiring 21.

Although at least one pad part 212 of all the pad parts 212 may satisfy the above relationship, it is effective due to the magnetic flux density that the pad part 212 near the center in the axial direction of the coil 20 satisfies the relationship, and the pad parts 212 near both end sides in the axial direction of the coil 20 may not necessarily satisfy the relationship. It is preferable that a half or more of all the pad parts 212 satisfy the relationship, and it is more preferable that 80% or more of the pad parts 212 satisfy the relationship. Unless otherwise specified, the same applies to the subsequent features of the pad parts 212.

Hereinafter, when the first coil wiring 21A and the second coil wiring 21B will be described, the same applies to the other coil wirings 211, and therefore, the description thereof will not be made.

Preferably, the inductor component 1 has a size of less than 0.7 mm in a direction parallel to the bottom surface 17 and perpendicular to the axis of the coil, and a size of less than 0.4 mm in a direction parallel to the axis of the coil. For example, the size of the inductor component (L direction×W direction×T direction) is 0.6 mm×0.3 mm×0.3 mm, 0.4 mm×0.2 mm×0.2 mm, or 0.25 mm×0.125 mm×0.120 mm. The lengths in the W direction and the T direction may not be equal, and may be, for example, 0.4 mm×0.2 mm×0.3 mm. According to the configuration, even if the inductor component 1 is reduced in size, the interference with the magnetic flux of the coil 20 can effectively be reduced.

In this case, the protrusion amount e of the first pad part 212A is preferably 21 μm or less. According to the configuration described above, the magnetic flux is hardly blocked by the pad part 212A. For example, the width dimension h of the wiring part 211 is 15 μm, and the diameter of the pad part 212A is 36 μm. Therefore, in this case, the center in the width direction of the wiring part 211 and the center of the pad part 212A are not coincident with each other, and the center of the pad part 212A is located inside the coil 20 by 3 μm from the center of the wiring part 211. In this case, the protrusion amount e of the first pad part 212A is 1.4 times of the width dimension h of the wiring part 211. At least one pad part 212 of all the pad parts 212 may satisfy the relationship described above.

Figure 6:
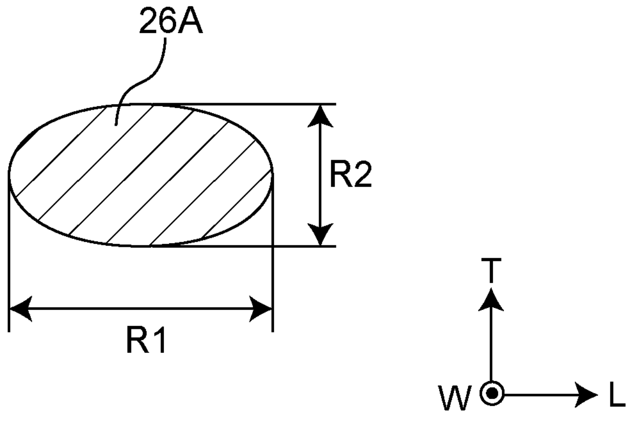
FIG. 6 is cross-sectional view showing another shape of a via wiring.

Modifications of the inductor component 1 will hereinafter be described with reference to the drawings. Portions not specifically described are the same as the configurations described above. FIG. 6 is a cross-sectional view showing another shape of the via wiring. As shown in FIG. 6, a first length R1 of a via wiring 26A in the extending direction of the coil wiring 21 is longer than a second length R2 of the via wiring 26A in the width direction of the coil wiring 21. Specifically, the coil wiring 21 in contact with the via wiring 26A has a contact portion in contact with the via wiring 26A, and the first length R1 is the dimension in the extending direction (L direction of FIG. 6) of the contact portion, and the second length R2 is the length in the width direction (T direction of FIG. 6) of the contact portion. The via wiring 26A is elliptical or may be rectangular, oval, etc. According to the configuration described above, even when the protrusion amount e of the pad part 212 is limited, the first length R1 of the via wiring 26A in the extending direction of the contact portion of the coil wiring 21 having less limitation can be made longer to ensure the contact area of the via wiring 26A for the coil wiring 21 (i.e., the cross-sectional area of the via wiring 26A), and the connection reliability of the via wiring 26A for the coil wiring 21 can be ensured.

Figure 7:
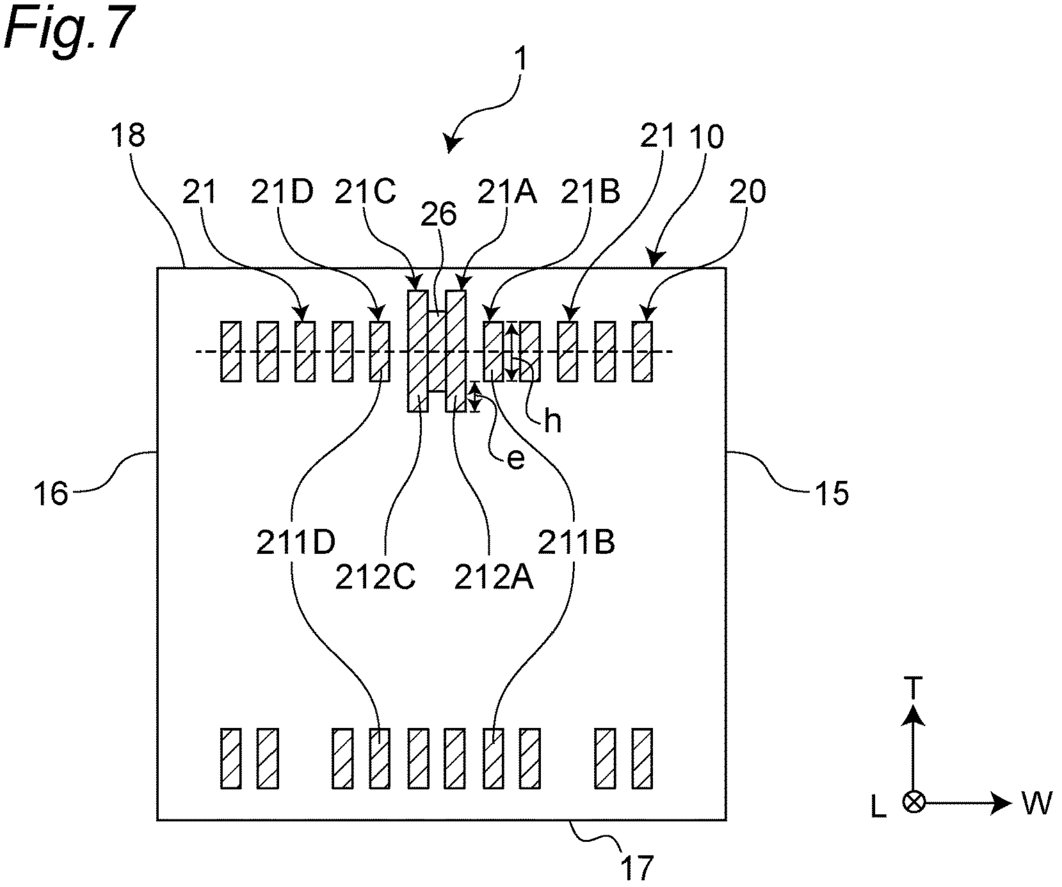
FIG. 7 is a cross-sectional view showing another shape of a pad part.

FIG. 7 is a cross-sectional view showing another shape of the pad part. The pad part shown in FIG. 7 is different in position and size from the pad part shown in FIG. 5. This different configuration will be described below. As shown in FIG. 7, the center of the first pad part 212A is located at the center in the width direction of the second wiring part 211B when viewed in the axial direction (W direction). Therefore, the first pad part 212A protrudes not only to the inside but also to the outside of the coil 20 relative to the wiring part 211B when viewed in the axial direction. According to the configuration described above, the magnetic flux is hardly blocked by the pad part 212A. The radius of the first pad part 212A is larger than that of FIG. 5 and is 21 μm, for example. Even in this case, if the width dimension h of the wiring part 211 is equivalent, for example, 15 μm, the protrusion amount e of the first pad part 212A to the inside of the coil 20 can be reduced to 13.5 μm and can be suppressed to 0.9 times of the width dimension h of the wiring part 211. Therefore, while the magnetic flux is hardly blocked by the pad part 212A, the contact area of the via wiring 26A for the coil wiring 21 can be ensured. At least one pad part 212 of all the pad parts 212 may satisfy the relationship described above.

Figure 8:
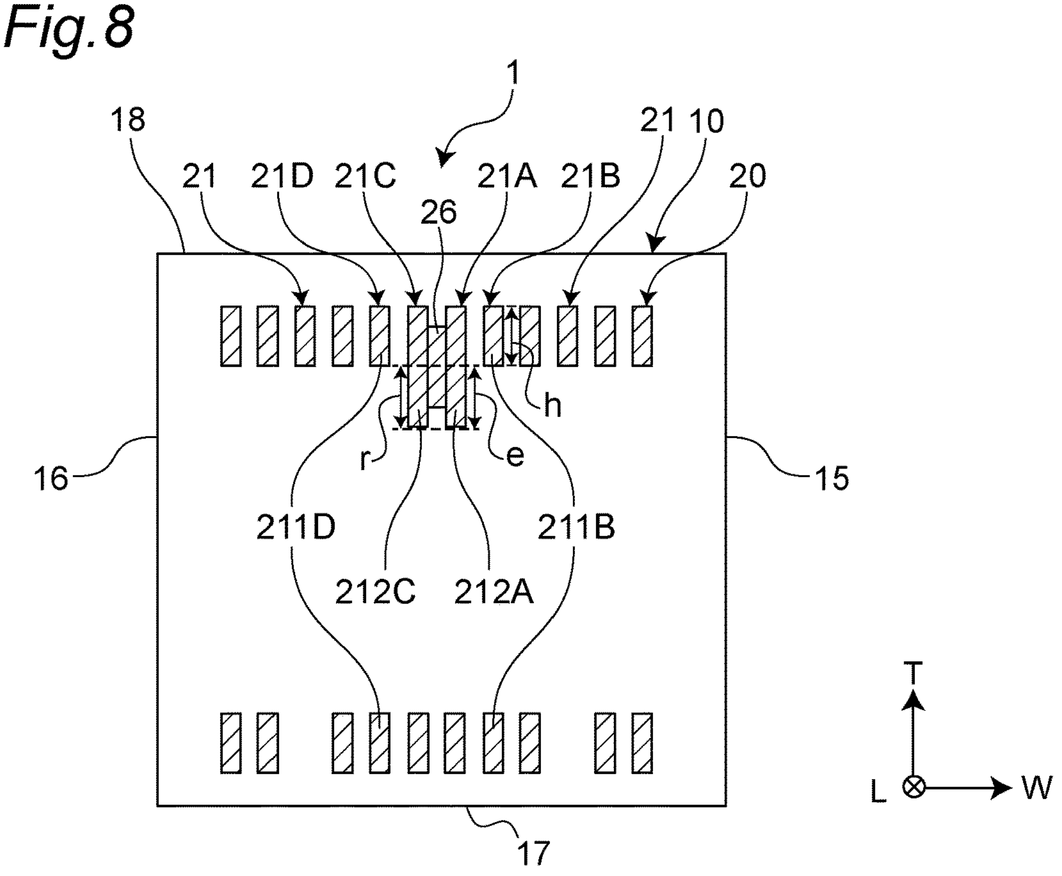
FIG. 8 is a cross-sectional view showing another shape of the pad part.

FIG. 8 is a cross-sectional view showing another shape of the wiring part. The wiring part shown in FIG. 8 is different in size from the wiring part shown in FIG. 5. This different configuration will be described below. As shown in FIG. 8, when viewed in the axial direction, the width dimension h of the wiring part 211 is equal to the radius r of the first pad part 212A, and is 18 μm or less, for example. Therefore, similarly to FIG. 5, when the first pad part 212A and the wiring part 211B are substantially flush with each other for the tip on the outside of the coil 20, the protrusion amount e of the first pad part 212A can be reduced to 18 μm or less and can be suppressed to 1.0 time of the width dimension h of the wiring part 211. According to the configuration described above, while the magnetic flux is hardly blocked by the pad part 212A, and the DC electric resistance can be reduced by making the wiring part 211 thicker. At least one pad part 212 of all the pad parts 212 may satisfy the relationship described above.

Figure 9:
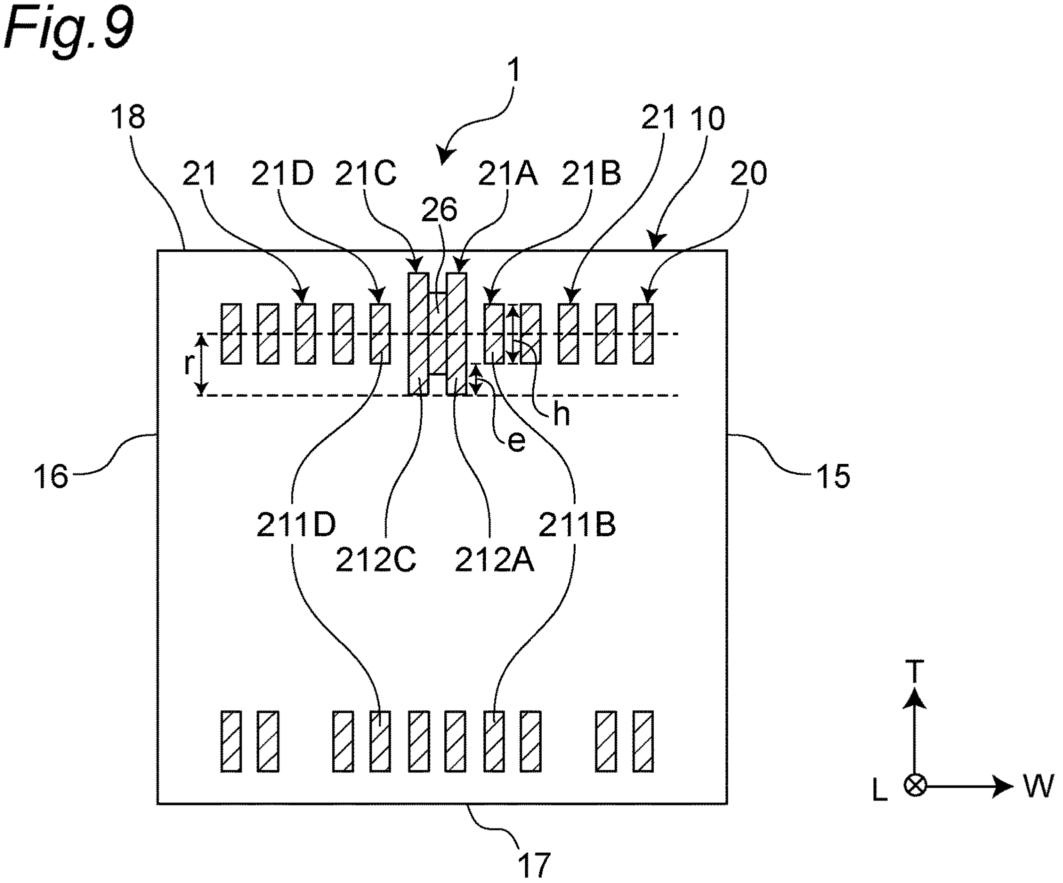
FIG. 9 is a cross-sectional view showing another shape of the pad part.

FIG. 9 is a cross-sectional view showing another shape of the pad part. The pad part shown in FIG. 9 is different in position from the pad part shown in FIG. 5. This different configuration will be described below. As shown in FIG. 9, the center of the first pad part 212A is located at the center in the width direction of the second wiring part 211B when viewed in the axial direction. In this case, even if the width dimension h of the wiring part 211 and the radius r of the first pad part 212A are equivalent to those in FIG. 5, for example, 15 μm and 18 μm, respectively, the protrusion amount e of the first pad part 212A can be reduced to 10.5 μm and can be suppressed to 0.7 times of the width dimension h of the wiring part 211. Although the protrusion amount e of the first pad part 212A has been defined by the relative value with the width dimension h of the wiring part 211 in the above description, the protrusion amount e of the first pad part 212A is more preferably 10.5 μm or less as shown in FIG. 9 regardless of the width dimension h. According to the configuration described above, the magnetic flux is hardly blocked by the pad part 212A. At least one pad part 212 of all the pad parts 212 may satisfy the relationship described above.

Figure 10:
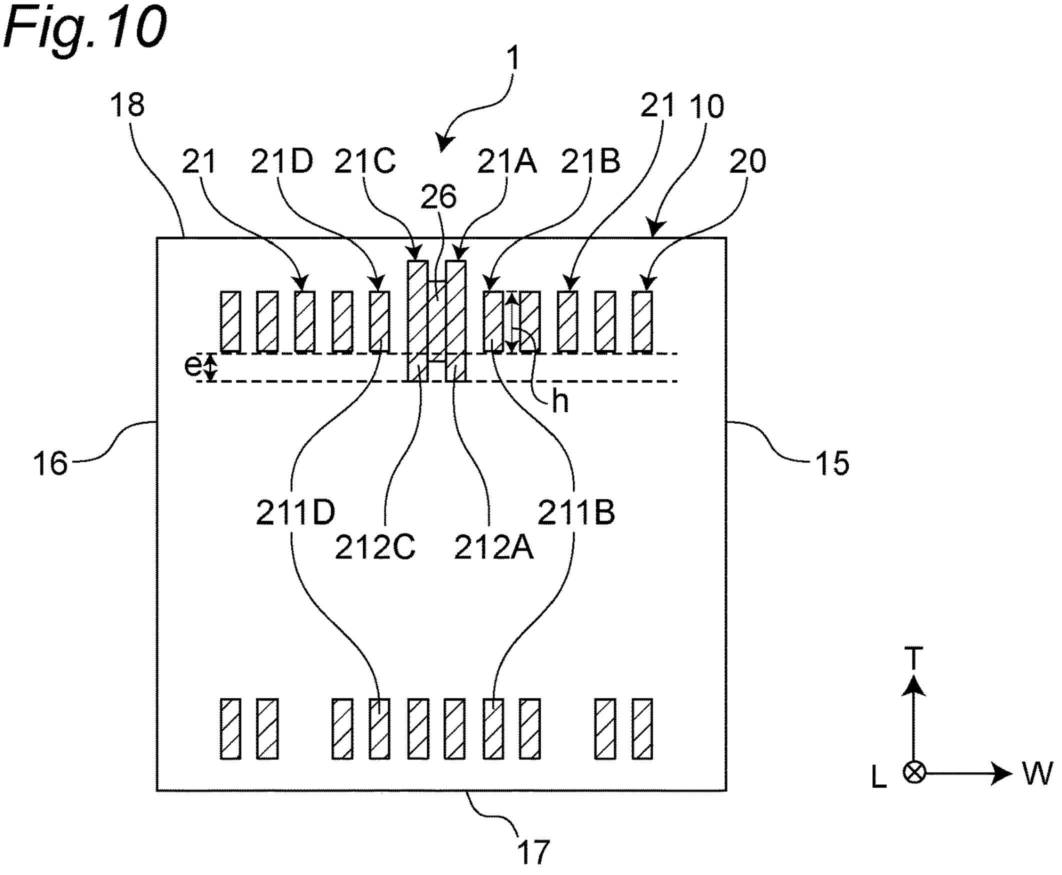
FIG. 10 is a cross-sectional view showing another shape of the pad part.

FIG. 10 is a cross-sectional view showing another shape of the pad part. The pad part shown in FIG. 10 is different in size from the pad part shown in FIG. 9. This different configuration will be described below. As shown in FIG. 10, although the width dimension h of the wiring part 211 is equivalent to that of FIG. 5, for example, 15 μm when viewed in the axial direction, the radius r of the first pad part 212A is smaller than that of FIG. 9, for example, 17 μm. In this case, the protrusion amount e of the first pad part 212A can be reduced to 9.5 μm and can be suppressed to about 0.63 times of the width dimension h of the wiring part 211. According to the configuration described above, the magnetic flux is hardly blocked by the pad part 212A. At least one pad part 212 of all the pad parts 212 may satisfy the relationship described above.

Figure 11:
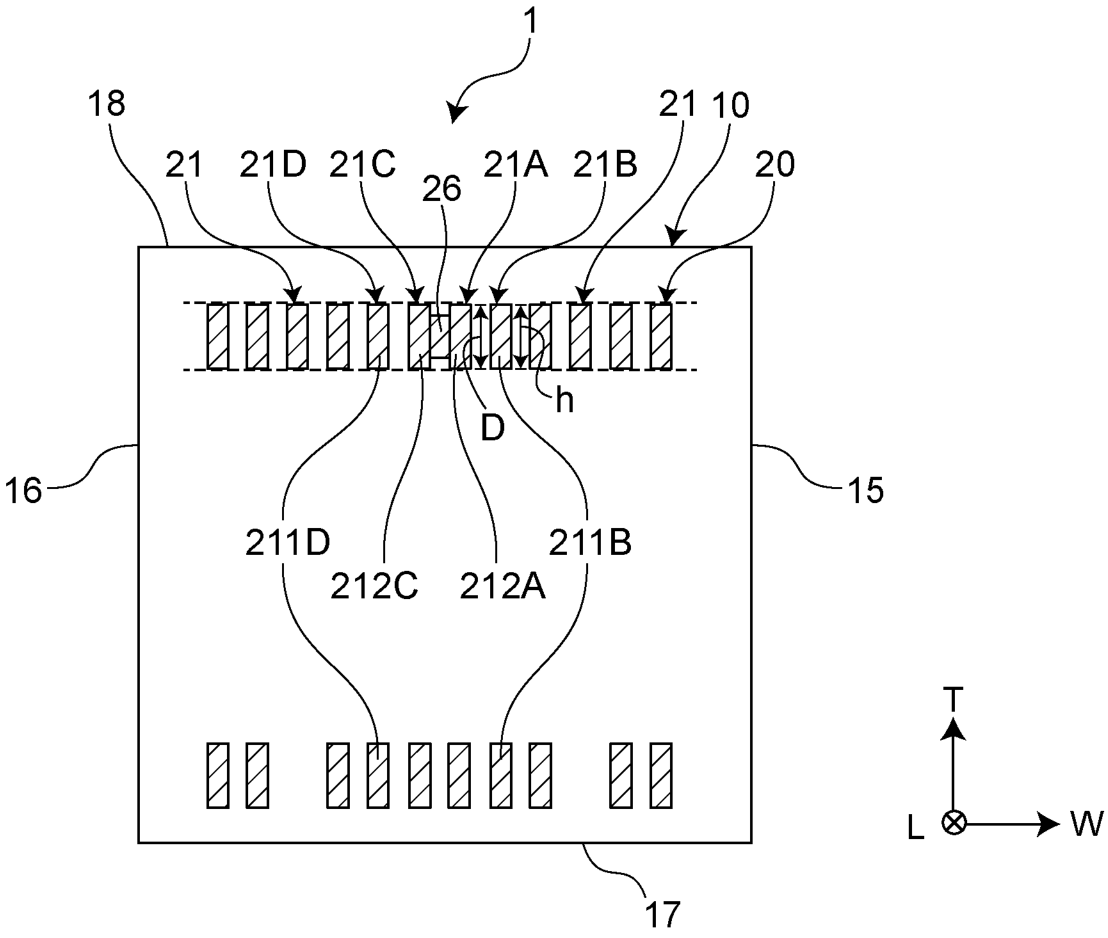
FIG. 11 is a cross-sectional view showing another shape of the pad part.

FIG. 11 is a cross-sectional view showing another shape of the pad part. The pad part shown in FIG. 11 is different in size from the pad part shown in FIG. 7. This different configuration will be described below. As shown in FIG. 11, a diameter D of the first pad part 212A is equal to the width dimension h of the second wiring part 211B when viewed in the axial direction. In this case, the position of the first pad part 212A is the same as that of FIG. 7. Therefore, the first pad part 212A does not project from the wiring part 211B to the inside or the outside of the coil 20 when viewed in the axial direction. According to the configuration described above, the magnetic flux is hardly blocked by the pad part 212A. At least one pad part 212 of all the pad parts 212 may satisfy the relationship described above.

The respective magnetic field strengths according to the examples in the structures of FIGS. 5, 7, 10, and 11 will be described.

In the example with the structure of FIG. 5, the width dimension h of the wiring part 211 is 15 μm, and the radius r of the first pad part 212A is 18 μm. Therefore, the protrusion amount e of the first pad part 212A in this example is 21 μm, which is 1.4 times of the width dimension h of the second wiring part 211B.

In the example with the structure of FIG. 7, the width dimension h of the wiring part 211 is 15 μm, and the radius r of the first pad part 212A is 21 μm. Therefore, the protrusion amount e of the first pad part 212A in this example is 13.5 μm, which is 0.9 times of the width dimension h of the second wiring part 211B. In the example with the structure of FIG. 10, the width dimension h of the wiring part 211 is 15 μm, and the radius r of the first pad part 212A is 17 μm. Therefore, the protrusion amount e of the first pad part 212A in this embodiment was 9.5 μm, which is about 0.63 times of the width dimension h of the second wiring part 211B.

In the example with the structure of FIG. 11, the width dimension h of the wiring part 211 is 15 μm, and the radius r of the first pad part 212A is 15 μm. Therefore, the protrusion amount e of the first pad part 212A in this example was 0 μm, which is 0 times of the width dimension h of the second wiring part 211B.

Figure 12A:
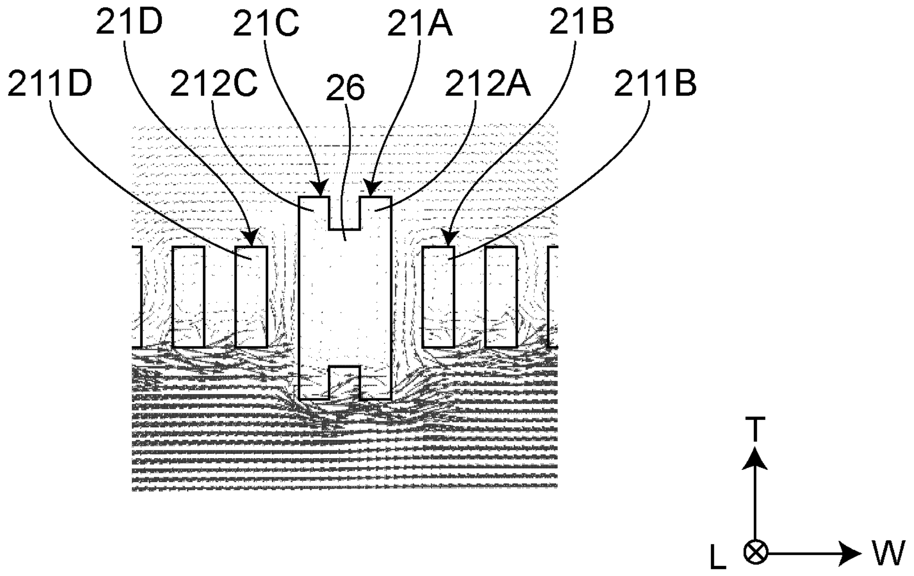
FIG. 12A is a schematic view of a magnetic field strength of FIG. 7.
Figure 12B:
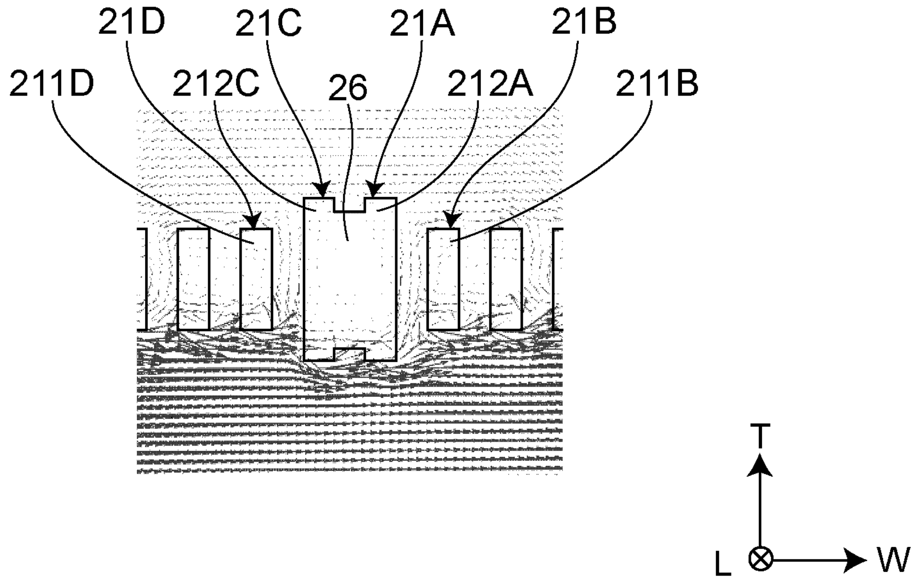
FIG. 12B is a schematic view of a magnetic field strength of FIG. 9.
Figure 12C:
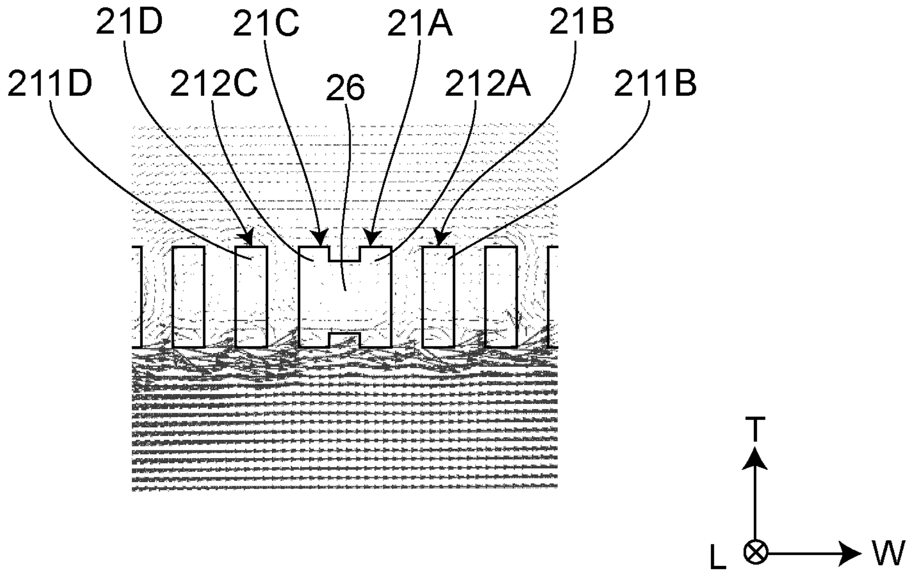
FIG. 12C is a schematic view of a magnetic field strength of FIG. 11.
Figure 12D:
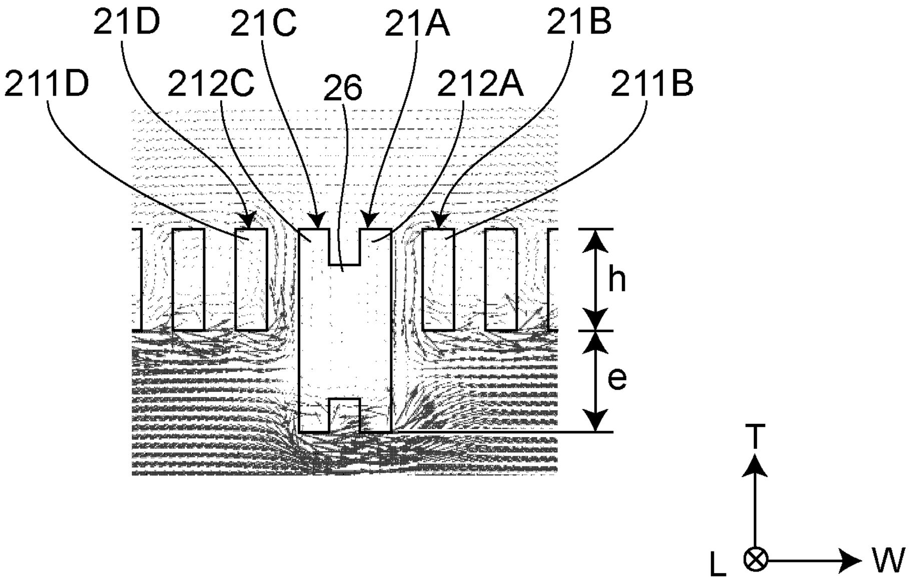
FIG. 12D is a schematic view of a magnetic field strength of a comparative example.

FIG. 12A is a schematic view of the magnetic field strength of FIG. 7, FIG. 12B is a schematic view of the magnetic field strength in the example of FIG. 10, and FIG. 12C is a schematic view of the magnetic field strength in the example of FIG. 11. FIG. 12D is a schematic view of the magnetic field strength of a comparative example.

In the comparative example with the structure of FIG. 12D, the width dimension h of the wiring part 211 is 15 μm, the radius of the first pad part 212A is 21 μm and, as in FIG. 5, the first pad part 212A and the wiring part 211B are substantially flush with each other for the tip on the outside of the coil 20. Therefore, the protrusion amount e of the first pad part 212A is 1.8 times of the width dimension h of the second wiring part 211B, and the protrusion amount e of the first pad part 212A is 27 μm.

As shown in FIGS. 12A, 12B, and 12C, the magnetic flux is less interfered with by the pad part 212A in the order of FIGS. 12A, 12B, and 12C. On the other hand, in FIG. 12D, the flow of magnetic flux is significantly interfered with by the pad part 212A.

Changes in the Q value of the examples and comparative example of FIGS. 5, 7, 10, and 11 will be described.

Figure 13A:
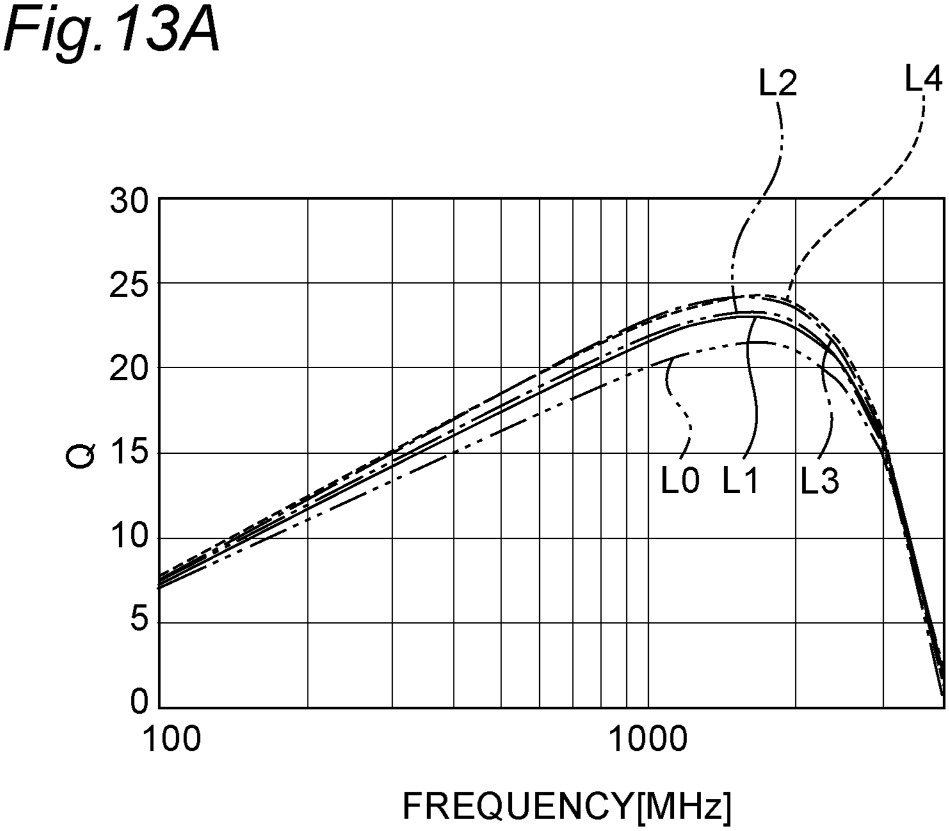
FIG. 13A is a graph showing a relationship between the frequency and the Q value.

FIG. 13A is a graph showing a relationship between the frequency and the Q value. In FIG. 13A, the graph of the example of FIG. 5 is indicated by a solid line L1, the graph of FIG. 7 is indicated by a dashed-two dotted line L2, the graph of FIG. 10 is indicated by a dashed-dotted line L3, the graph of FIG. 11 is indicated by a dotted line L4, and the graph of the comparative example is indicated by a dashed-three dotted line L0. As shown in FIG. 13, the Q value is improved in the order of L1, L2, L3, and L4, and the Q value of L0 is the lowest.

Figure 13B:
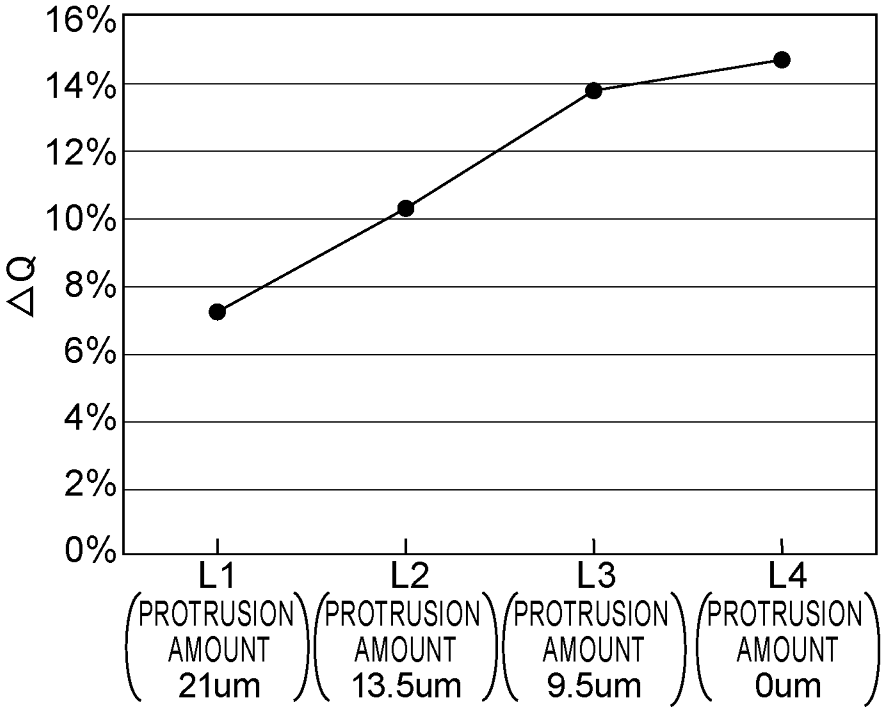
FIG. 13B is a graph showing a relative value of the Q value between examples and the comparative example.

FIG. 13B shows the Q values at a frequency of 1000 MHz in the examples of FIGS. 5 (graph L1), 7 (graph L2), 10 (graph L3), and 11 (graph L4) represented as a relative value to the Q value at a frequency of 1000 MHz in the comparative example (graph L0). As shown in FIG. 13B, it can be seen that the Q value is improved by about 7% in L1, about 10% in L2, and about 14% in L3 and L4, as compared with the comparative example. As shown in FIG. 13B, it can be seen that when the protrusion amount is 9.5 μm or less, the effect of improving the Q value is sufficiently obtained, which is particularly preferable.

Second Embodiment

Figure 14:
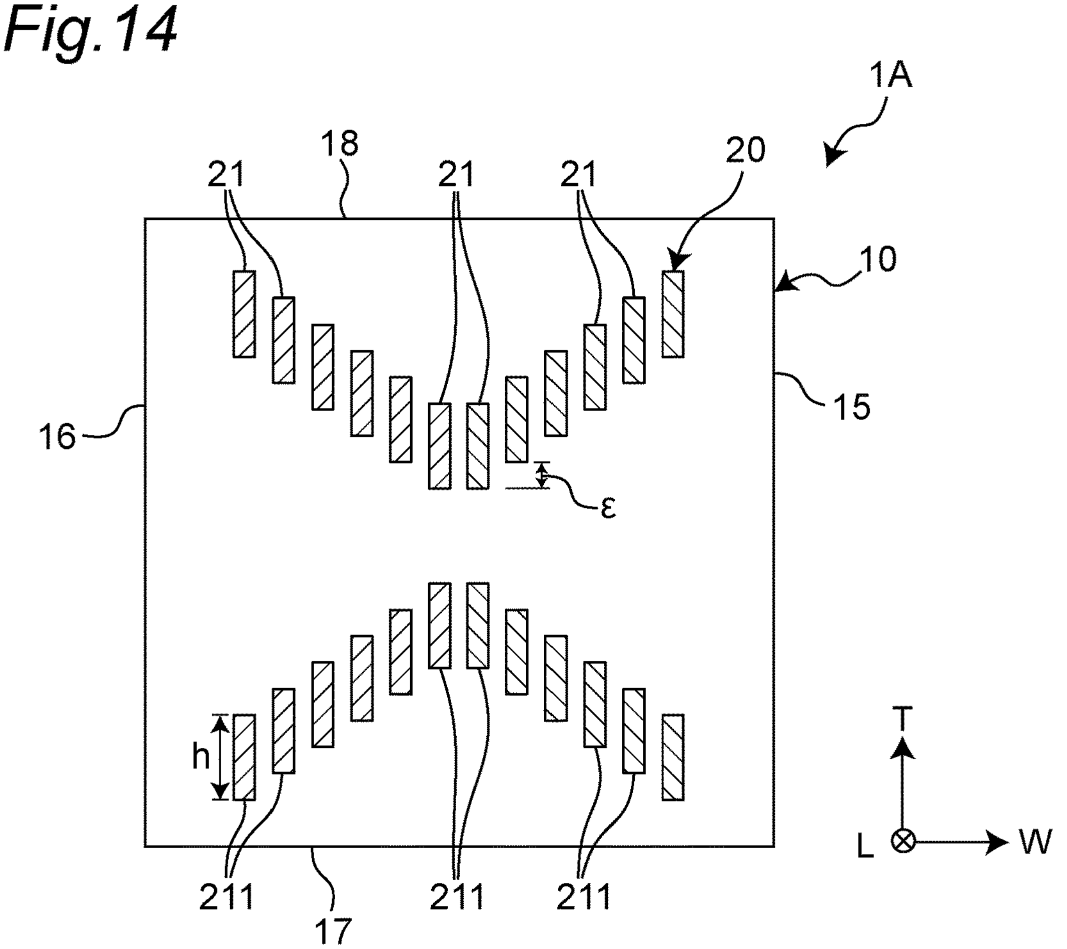
FIG. 14 is a cross-sectional view showing a second embodiment of the inductor component.

FIG. 14 is a cross-sectional view showing a second embodiment of the inductor component. The second embodiment is different in the inner diameter of the coil from the first embodiment. This different configuration will be described below. The other configurations are the same as those of the first embodiment and will not be described. In FIG. 14, the pad parts are omitted for convenience.

As shown in FIG. 14, in an inductor component 1A of the second embodiment, the inner diameter of the coil 20 increases from the center in the axial direction of the coil 20 toward both ends. Although the inner diameter of the coil 20 increases continuously, the inner diameter may increase stepwise. The width dimension h of the wiring parts 211 of all the coil wirings 21 is the same. Therefore, the outer diameter of the coil 20 increases from the center in the axial direction of the coil 20 toward both ends.

According to the configuration described above, the inner diameter of the coil 20 increases from the center in the axial direction of the coil 20 toward both ends, so that the flow of the magnetic flux is less interfered with at both ends of the coil 20. Therefore, the inner surface of the coil 20 has a shape along the flow of the magnetic flux. As a result, the loss at both ends of the coil 20 can be reduced, and the decrease of the Q value can be suppressed.

Figure 15:
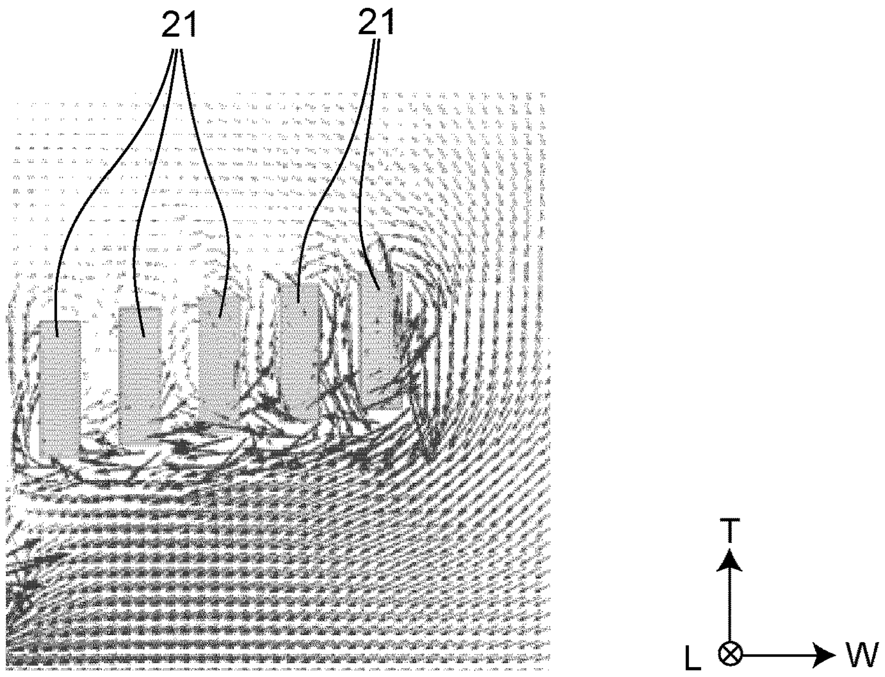
FIG. 15 is a schematic view of a magnetic field strength of FIG. 14.

FIG. 15 is a schematic view of the magnetic field strength of FIG. 14. FIG. 15 shows the magnetic field strength in an end portion on the first side surface 15 side and the top surface 18 side of the coil 20. As shown in FIG. 15, in the end portion of the coil 20, the inner surface of the coil wiring 21 is arranged along the flow of the magnetic flux, so that the flow of the magnetic flux is smooth.

Figure 16A:
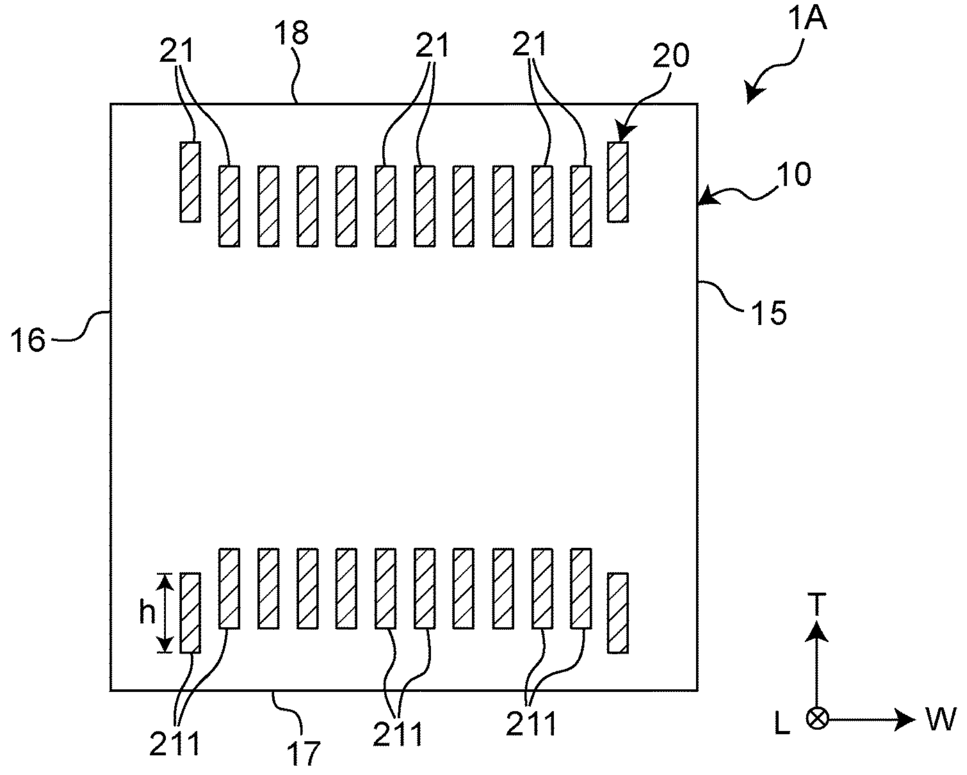
FIG. 16A is a cross-sectional view showing another shape of the inductor component of FIG. 14.
Figure 16B:
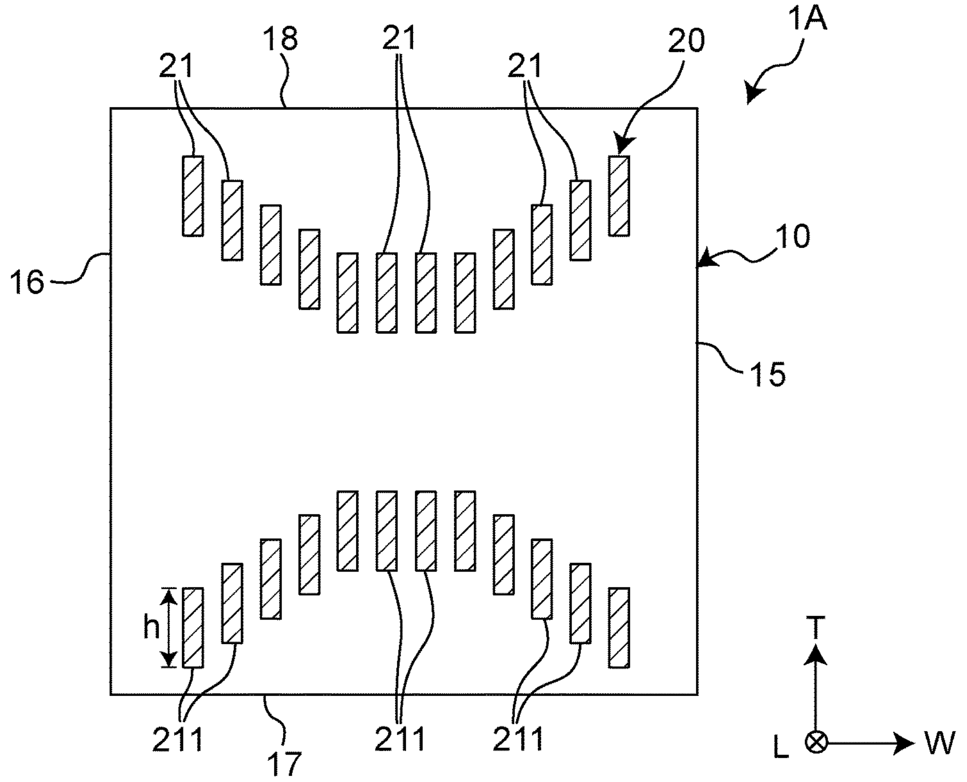
FIG. 16B is a cross-sectional view showing another shape of the inductor component of FIG. 14.

FIG. 16A is a cross-sectional view showing another shape of the inductor component 1A of FIG. 14. As shown in FIG. 16A, the inner diameter of the coil wiring 21 at both ends in the axial direction of the coil 20 is larger than the inner diameter of the other coil wirings 21. The inner diameters of the other coil wirings 21 are all the same. In the other coil wirings 21, the inner diameter of some wirings may be different from the inner diameter of the other wirings, and as shown in FIG. 16B, only the four layers of the coil wirings 21 near the center in the axial direction of the coil 20 may have the same inner diameter. Also in this case, the inner diameter of the coil 20 increases from the center in the axial direction of the coil 20 toward both ends.

Figure 17A:
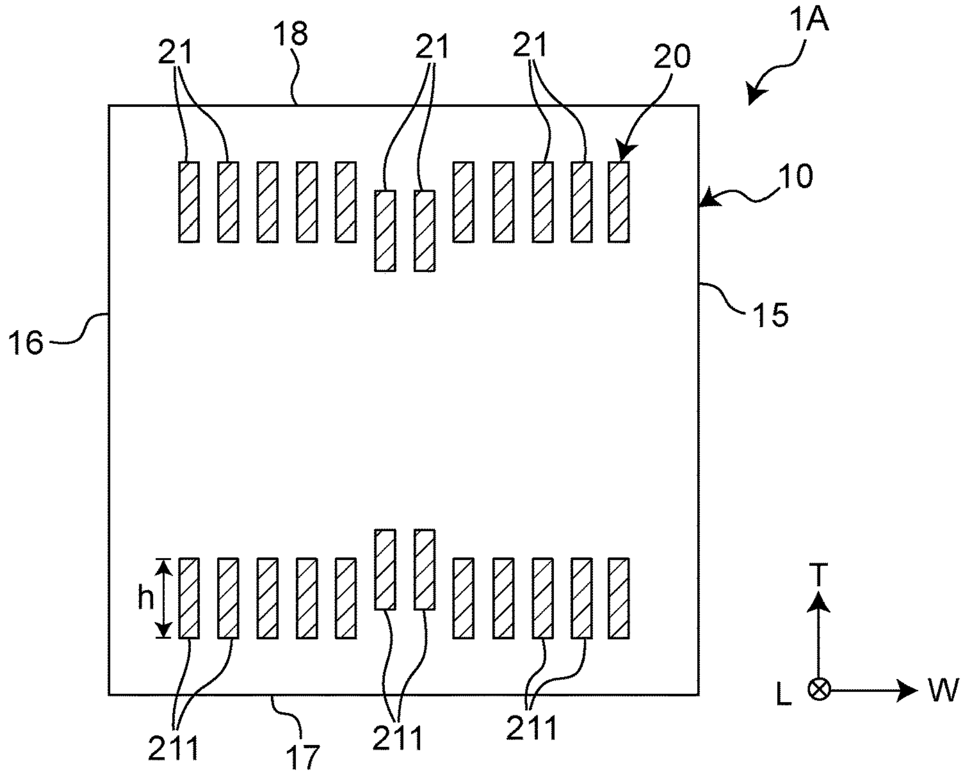
FIG. 17A is a cross-sectional view showing another shape of the inductor component of FIG. 14.
Figure 17B:
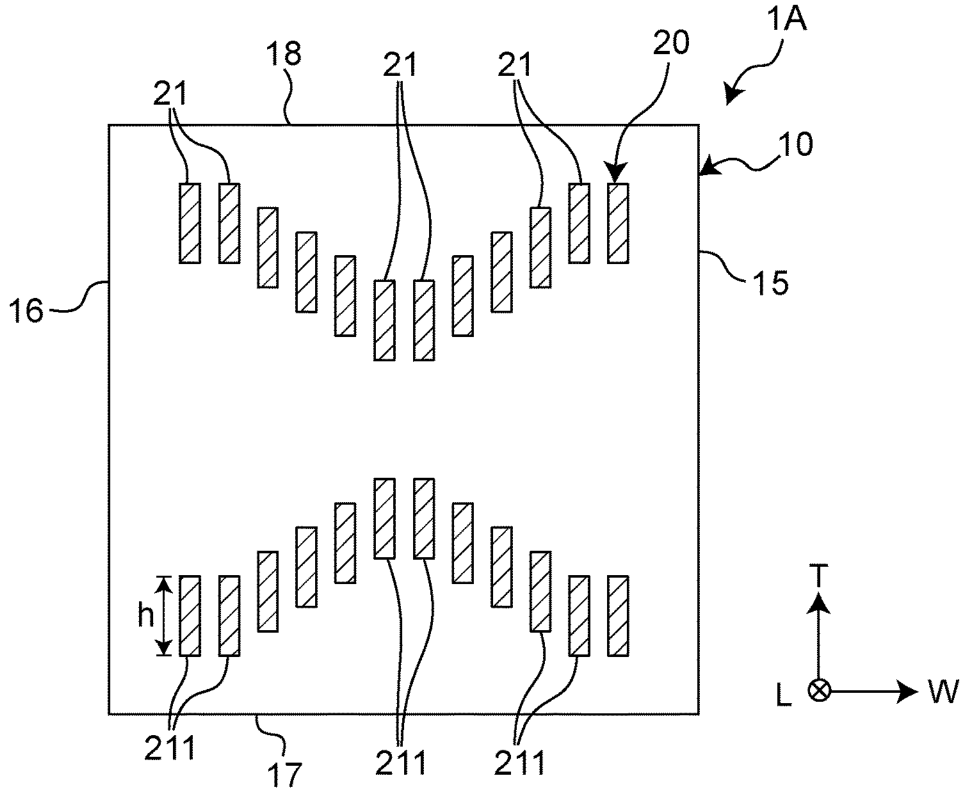
FIG. 17B is a cross-sectional view showing another shape of the inductor component of FIG. 14.

FIG. 17A is a cross-sectional view showing another shape of the inductor component 1A of FIG. 14. As shown in FIG. 17A, the inner diameters of the two layers of the coil wirings 21 near the center in the axial direction of the coil 20 are smaller than the inner diameters of the other coil wirings 21. The inner diameters of the other coil wirings 21 are all the same. In the other coil wirings 21, the inner diameter of some wirings may be different from the inner diameter of the other wirings, and as shown in FIG. 17B, only the two layers of the coil wirings 21 near each of both ends in the axial direction of the coil 20 may have the same inner diameter. Also in this case, the inner diameter of the coil 20 increases from the center in the axial direction of the coil 20 toward both ends.

Figure 18:
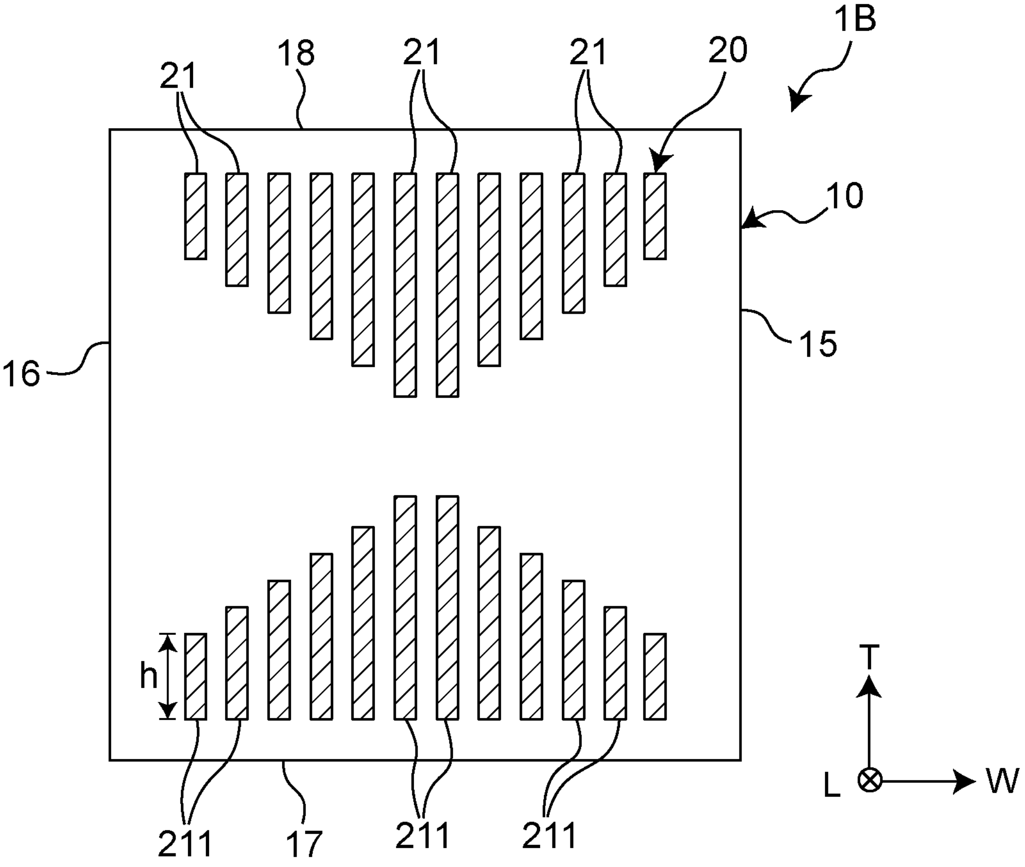
FIG. 18 is a cross-sectional view showing another shape of the inductor component of FIG. 14.

FIG. 18 is a cross-sectional view showing another shape of the inductor component 1A of FIG. 14. In the inductor component 1B shown in FIG. 18, the outer diameters of all the coil wirings 21 are the same as compared to those of the inductor component 1A of FIG. 14. Therefore, the width dimension h of the wiring part 211 of the coil wiring 21 decreases from the center in the axial direction of the coil 20 toward both ends. Also in this case, the inner diameter of the coil 20 increases from the center in the axial direction of the coil 20 toward both ends.

Figure 19A:
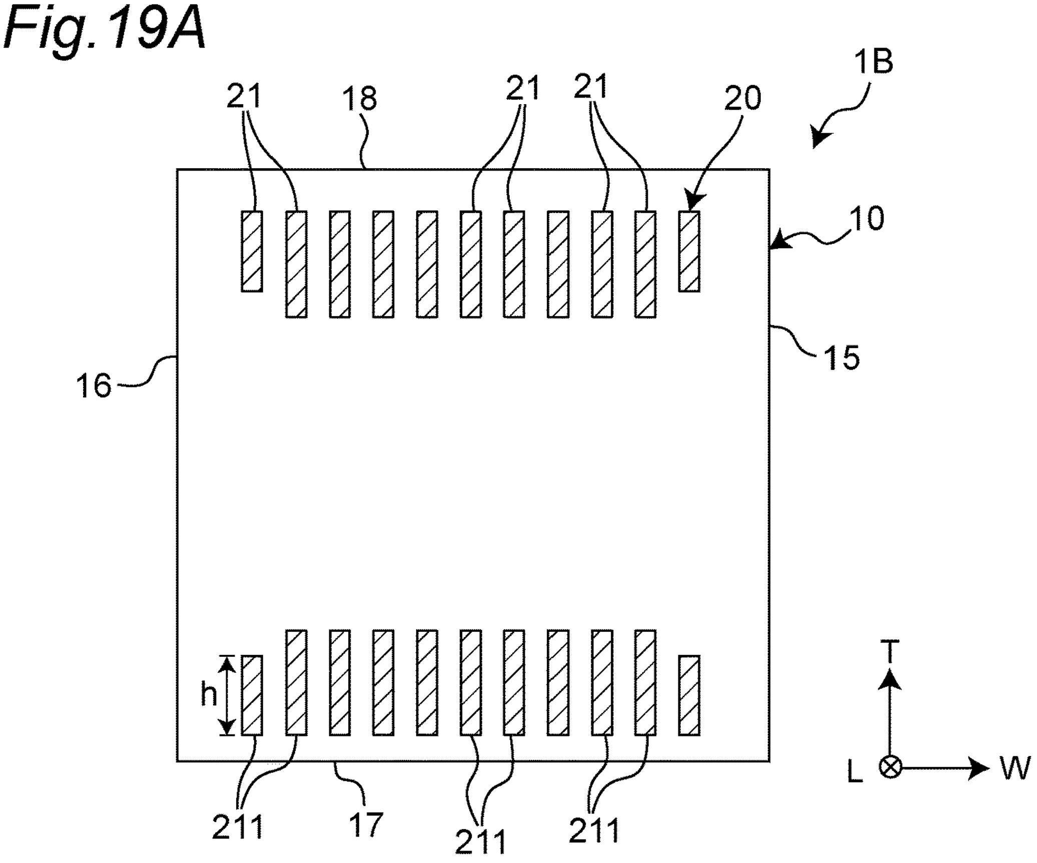
FIG. 19A is a cross-sectional view showing another shape of the inductor component of FIG. 18.
Figure 19B:
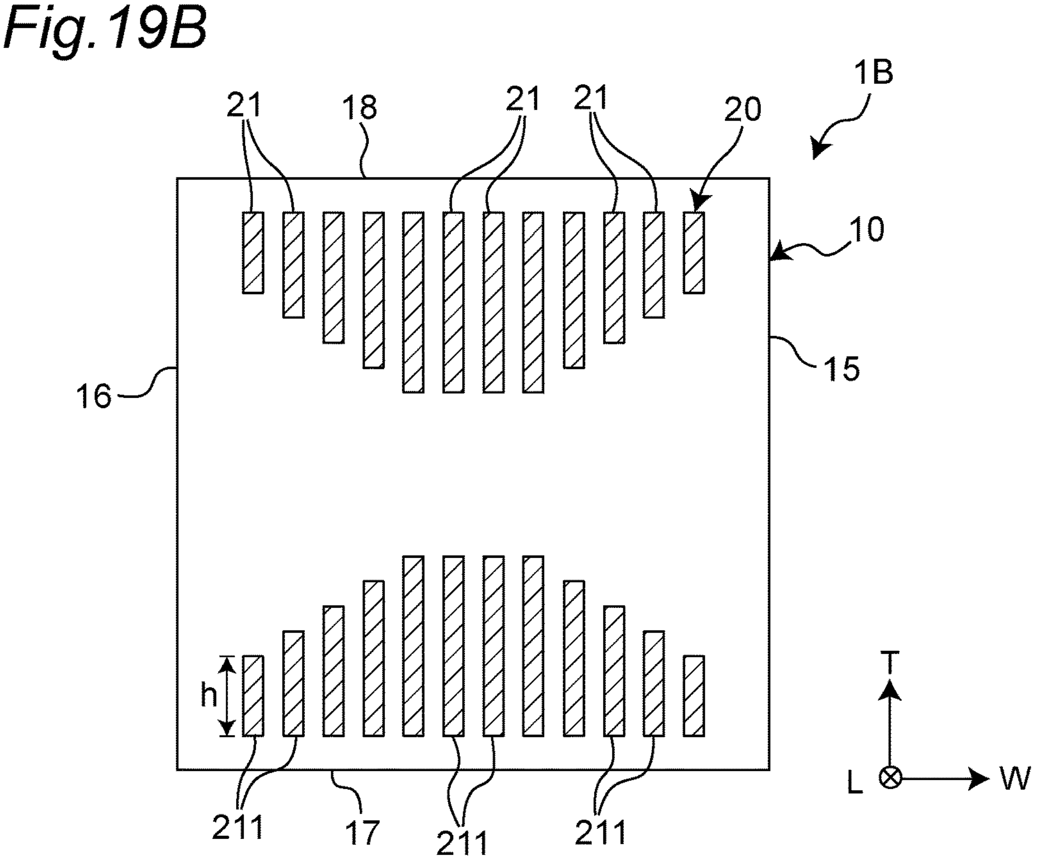
FIG. 19B is a cross-sectional view showing another shape of the inductor component of FIG. 18.

FIG. 19A is a cross-sectional view showing another shape of the inductor component 1B of FIG. 18. As shown in FIG. 19A, the inner diameters of the coil wirings 21 at both ends in the axial direction of the coil 20 are larger than the inner diameter of the other coil wirings 21. The inner diameters of the other coil wirings 21 are all the same. In the other coil wiring 21, the inner diameter of some wirings may be different from the inner diameter of the other wirings, and as shown in FIG. 19B, only the four layers of the coil wirings 21 near the center in the axial direction of the coil 20 may have the same inner diameter. Also in this case, the inner diameter of the coil 20 increases from the center in the axial direction of the coil 20 toward both ends.

Figure 20A:
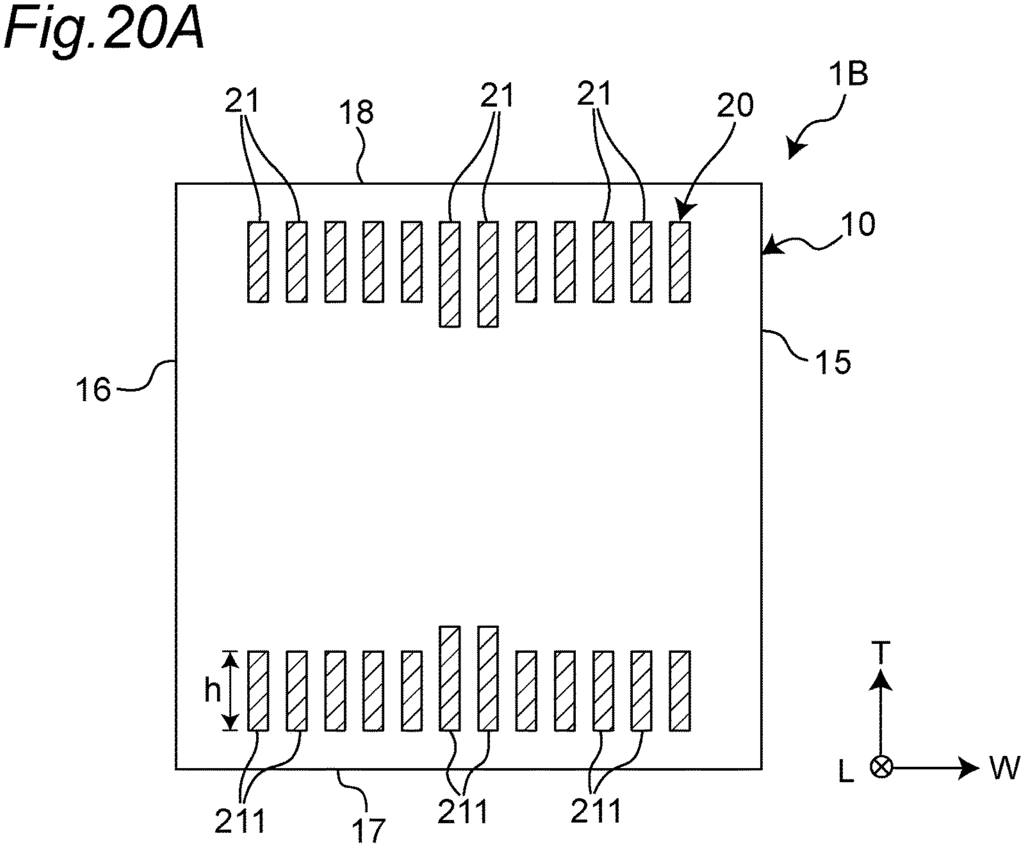
FIG. 20A is a cross-sectional view showing another shape of the inductor component of FIG. 18.
Figure 20B:
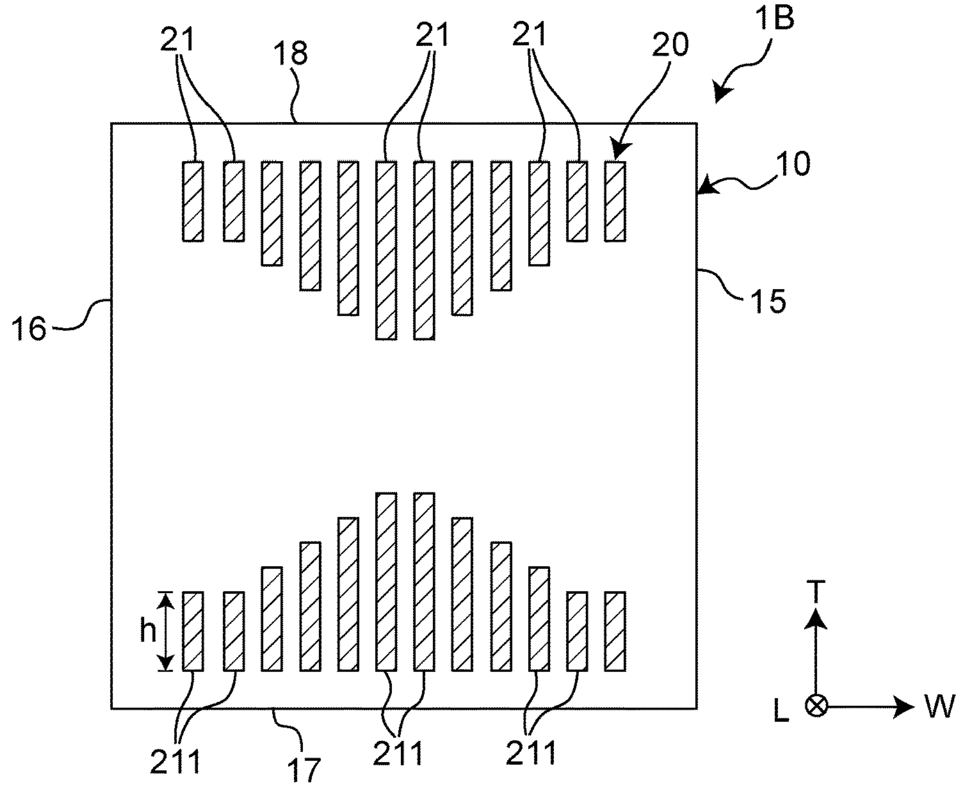
FIG. 20B is a cross-sectional view showing another shape of the inductor component of FIG. 18.

FIG. 20A is a cross-sectional view showing another shape of the inductor component 1B of FIG. 18. As shown in FIG. 20A, the inner diameters of the two layers of the coil wirings 21 near the center in the axial direction of the coil 20 are smaller than the inner diameters of the other coil wirings 21. The inner diameters of the other coil wirings 21 are all the same. In the other coil wiring 21, the inner diameter of some wirings may be different from the inner diameter of the other wirings, and as shown in FIG. 20B, only the two layers of the coil wirings 21 near each of both ends in the axial direction of the coil 20 may have the same inner diameter. Also in this case, the inner diameter of the coil 20 increases from the center in the axial direction of the coil 20 toward both ends.

As shown in FIG. 14, in at least two coil wirings 21 of all the coil wirings 21, the inner diameter of one coil wiring 21 of the two coil wirings 21 adjacent to each other in the axial direction is larger than the inner diameter of the other coil wiring 21, and when viewed in the axial direction, a deviation width F between the inner surface of the one coil wiring 21 and the inner surface of the other coil wiring 21 is preferably 1 μm or more and 4 μm or less (i.e., from 1 μm to 4 μm). The inner diameter of the coil wiring 21 refers to the inner diameter of the wiring part 211 of the coil wiring 21. The inner surface of the coil wiring 21 refers to the inner surface of the wiring part 211 of the coil wiring 21.

According to the configuration described above, the deviation width F between the inner surface of the one coil wiring 21 and the inner surface of the other coil wiring 21 is 1 μm or more and 4 μm or less (i.e., from 1 μm to 4 μm), so that the inner surface of the coil wiring 21 can easily be arranged along the magnetic flux, and the flow of the magnetic flux is hardly interfered with on the inner surface of the coil wiring 21. On the other hand, in the case of 4 μm or more, the flow of the magnetic flux is easily interfered with on the inner surface of the coil wiring 21, and in the case of 1 μm or less, the inner surface of the coil wiring 21 becomes difficult to arrange along the magnetic flux.

More preferably, in all the coil wirings 21, the inner diameter of the one coil wiring 21 is larger than the inner diameter of the other coil wiring 21, and when viewed in the axial direction, the deviation width F between the inner surface of the one coil wiring 21 and the inner surface of the other coil wiring 21 is 1 μm or more and 4 μm or less (i.e., from 1 μm to 4 μm). According to the configuration described above, the inner surfaces of all the coil wirings 21 are easily arranged along the magnetic flux, and the flow of the magnetic flux is hardly interfered with on the inner surfaces of the coil wirings 21.

Figure 21:
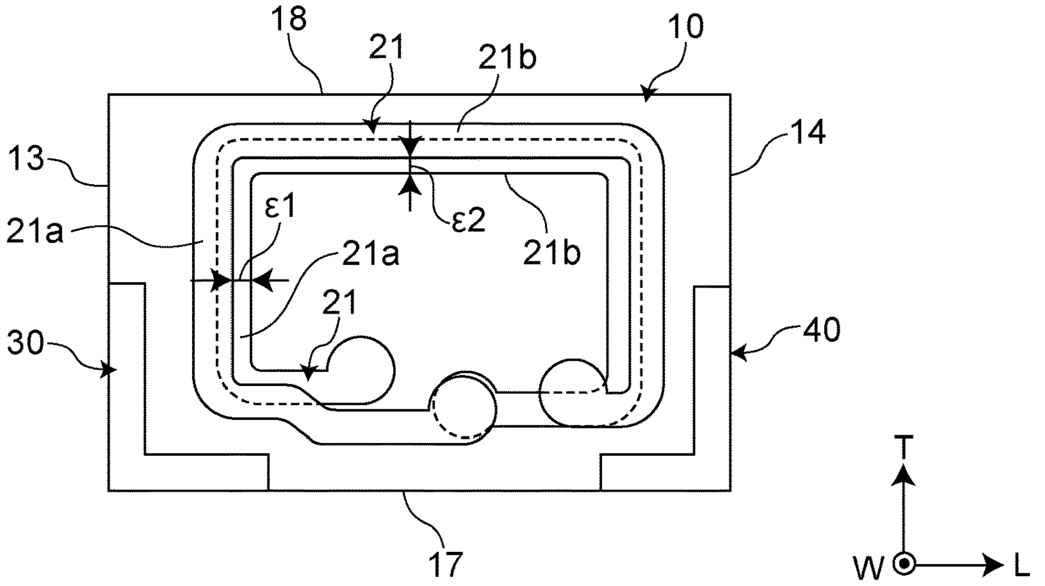
FIG. 21 a perspective front view from the first side surface side showing another shape of an inductor component.

The deviation width F may not be constant along the extending direction of the same coil wiring 21. For example, as shown in FIG. 21, the coil wiring 21 has a first portion 21*a* extending in the direction (T direction) intersecting with the top surface 18 and the bottom surface 17, and a second portion 21*b* extending in the direction (L direction) intersecting with the first end surface 13 and the second end surface 14. A first deviation width ε1 in the L direction of the first portion 21*a* is larger than a second deviation width ε2 in the T direction of the second portion 21*b*.

According to the configuration described above, since the size of the element body 10 in the L direction is usually larger than the size of the element body 10 in the T direction, the element body 10 has a margin in the space for extending the second portion 21*b* of the coil wiring 21 as compared to the space for extending the first portion 21*a* of the coil wiring 21. Therefore, the first deviation width ε1 in the L direction of the first portion 21*a* of the coil wiring 21 can be made larger.

The first deviation width ε1 may be smaller than the second deviation width F2. The deviation width ε of the coil wiring 21 of each layer may not be constant. Specifically, for example, the deviation width ε between the coil wiring 21 of the first layer and the coil wiring 21 of the second layer may be 4 μm, and the deviation width ε between the coil wiring 21 of the second layer and the coil wiring 21 of the third layer may be 3 μm.

The deviation width ε is preferably symmetrical with respect to the center in the axial direction of the coil 20. For example, when five layers of the coil wirings 21 are included, the deviation width ε between the coil wiring 21 of the first layer and the coil wiring 21 of the second layer is 4 μm, the deviation width ε between the coil wiring 21 of the second layer and the coil wiring of the third layer is 3 μm, the deviation width ε between the coil wiring 21 of the third layer and the coil wiring 21 of the fourth layer is 3 μm, and the deviation width ε between the coil wiring 21 of the fourth layer and the coil wiring 21 of the fifth layer is 4 μm.

Third Embodiment

Figure 22:
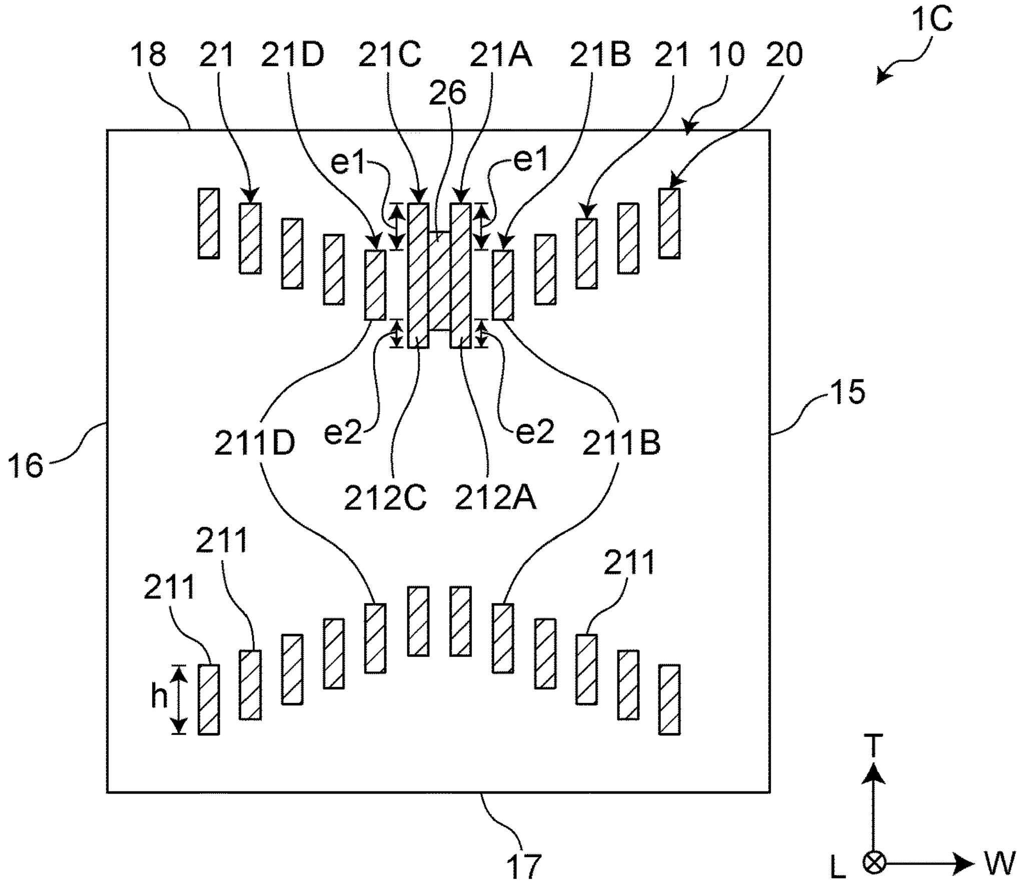
FIG. 22 is a cross-sectional view showing a third embodiment of the inductor component.

FIG. 22 is a cross-sectional view showing a third embodiment of the inductor component. The third embodiment is different from the second embodiment in that the pad part is drawn. This different configuration will be described below. The other configurations are the same as those of the second embodiment and will not be described. In the third embodiment, the same reference numerals as those in the first embodiment denote the names of the same members as in the first embodiment.

As shown in FIG. 22, in an inductor component 1C of the third embodiment, the width dimension h of the wiring parts 211 of all the coil wirings 21 is the same. The first coil wiring 21A corresponds to a portion having a small inner diameter of the coil 20. When viewed in the axial direction, a first protrusion amount e1 from the second wiring part 211B of the first pad part 212A to the outside of the coil 20 is greater than or equal to a second protrusion amount e2 from the second wiring part 211B of the first pad part 212A to the inside of the coil 20.

According to the configuration described above, a side gap on the radial outside of the first coil wiring 21A is wider than a side gap on the radial outside of the coil wiring 21 corresponding to a portion having a large inner diameter of the coil 20 (i.e., located on the outer side in the axial direction of the coil 20), and therefore, even if the first pad part 212A is shifted to the side gap on the outside of the first coil wiring 21A, the constant side gap can be ensured on the radial outside of the entire coil. Since the side gap can be ensured in this way, it is not necessary to reduce the diameter of the coil 20 or increase the size of the element body 10.

Additionally, by simply shifting the first pad part 212A to the side gap on the outside of the first coil wiring 21A, the second protrusion amount e2 of the first pad part 212A to the inside of the coil 20 can easily be reduced, and furthermore, the cross-sectional area of the first pad part 212A and the cross-sectional area of the via wiring 26 can be ensured, so that the connection reliability of the via wiring 26 for the coil wiring 21 can be ensured.

More preferably, the first coil wiring 21A corresponds to a portion having the smallest inner diameter of the coil 20. According to the configuration described above, the side gap on the radial outside of the first coil wiring 21A is the widest among the side gaps on the outside of the entire coil. Therefore, even if the first pad part 212A is shifted to the side gap on the outside of the first coil wiring 21A, the side gap on the outside of the entire coil can more reliably be ensured.

Although the first coil wiring 21A and the second coil wiring 21B have been described, the same applies to the third coil wiring 21C (third pad part 212C), the fourth coil wiring 21D (fourth wiring part 211D), and the other coil wirings 21, and therefore, the description thereof will not be made.

Preferably, the first pad part 212A is located on the top surface 18 side relative to the bottom surface 17 side. According to the configuration described above, even if the first pad part 212A is shifted to the side gap on the outside of the first coil wiring 21A on the top surface 18 side, the side gap on the outside of the entire coil can be ensured. Specifically, although it is difficult to ensure the side gap on the outside of the coil on the top surface 18 side as compared to the bottom surface 17 side since the L-shaped external electrodes 30, 40 do not exist, the side gap on the outside of the coil can be ensured on the top surface 18 side by achieving the configuration described above.

Figure 23:
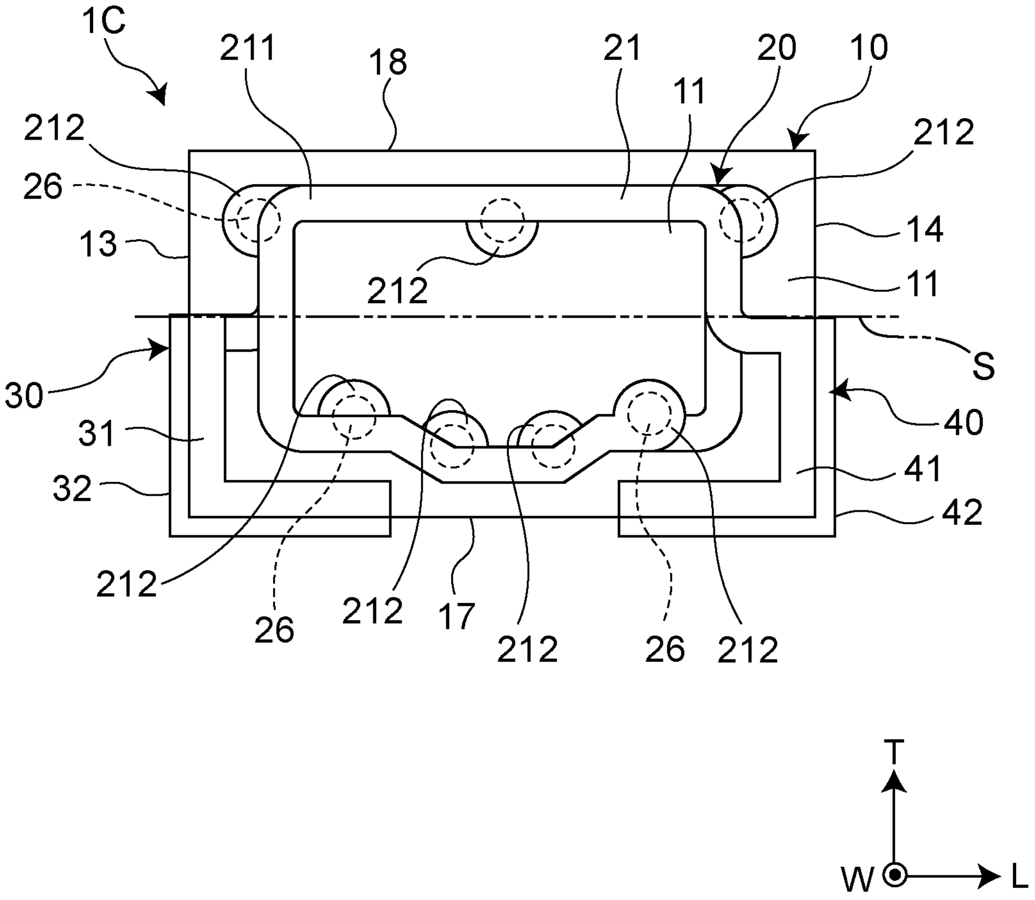
FIG. 23 is a perspective front view showing a preferable form of the inductor component.

FIG. 23 is a perspective front view showing a preferable form of the inductor component 1C. In FIG. 23, although the inner diameter of the coil 20 actually increases from the center in the axial direction toward both ends as shown in FIG. 22, the coil 20 is drawn to have the same inner diameter along the axial direction for convenience.

As shown in FIG. 23, in the coil wirings 21 located on the outer side in the axial direction among all the coil wirings 21, the pad part 212 is located on the bottom surface 17 side relative to an end edge on the top surface 18 side of the first external electrode 30 and an end edge on the top surface 18 side of the second external electrode 40 when viewed in the axial direction (W direction). Therefore, the pad parts 212 of the coil wirings 21 located on the outer side in the axial direction are located on the bottom surface 17 side relative to a virtual plane S in contact with the end edge on the top surface 18 side of the first external electrode 30 and the end edge on the top surface 18 side of the second external electrode 40 when viewed in the axial direction.

Referring to FIG. 2, the coil wirings 21 located on the outer side in the axial direction refer to the coil wirings 21 from the bottom to the fourth layer and the coil wirings 21 from the top to the fourth layer of the 12 layers of the coil wirings 21. Therefore, the coil wirings 21 located on the outer side in the axial direction refer to the coil wirings 21 in the upper and lower ⅓ of the layers of all the coil wirings 21.

Obviously, the pad part 212 of the coil wiring 21 located on the outermost side in the axial direction is located on the bottom surface 17 side relative to the end edge on the top surface 18 side of the first external electrode 30 and the end edge on the top surface 18 side of the second external electrode 30 when viewed in the axial direction.

According to the configuration described above, although the inner diameter of the coil wirings 21 located on the outer side in the axial direction becomes large, the pad part 212 is located on the bottom surface 17 side relative to the end edge on the top surface 18 side of the first external electrode 30 and the end edge on the top surface 18 side of the second external electrode 30, so that even if the protrusion of the pad part 212 is shifted to the outside of the coil 20, an influence on the side gap of the entire coil is small, and the protrusion of the pad part 212 to the inside of the coil 20 can effectively be reduced.

The present disclosure is not limited to the embodiments described above and may be changed in design without departing from the spirit of the present disclosure. For example, respective feature points of the first to third embodiments may variously be combined.

In the embodiments, the first and second external electrodes are L-shaped; however, the external electrodes may be five-sided electrodes, for example. Therefore, the first external electrode may be disposed on the entire first end surface and a portion of each of the first side surface, the second side surface, the bottom surface, and the top surface, and the second external electrode may be disposed on the entire second end surface and a portion of each of the first side surface, the second side surface, the bottom surface, and the top surface. Alternatively, the first external electrode and the second external electrode may each be disposed on a portion of the bottom surface.

What is claimed is:

1. An inductor component comprising:

an element body including a first end surface and a second end surface opposite to each other, a first side surface and a second side surface opposite to each other, a bottom surface connected between the first end surface and the second end surface and between the first side surface and the second side surface, and a top surface opposite to the bottom surface;

a coil disposed in the element body; and a first external electrode and a second external electrode disposed on the element body and electrically connected to the coil, wherein the coil has a helical structure in which the coil is wound while proceeding along an axis such that the axis is parallel to the bottom surface of the element body and intersects with the first side surface and the second side surface, the coil includes multiple coil wirings laminated along the axis and each wound along a plane, and a via wiring connecting the multiple coil wirings, the coil wirings include a wiring part extending along a plane and a pad part disposed at an end portion of the wiring part and connected to the via wiring, and in the first coil wiring and the second coil wiring adjacent to each other in an axial direction, the first coil wiring is located on a central side in the axial direction of the coil relative to the second coil wiring, and a first pad part of the first coil wiring is adjacent to a second wiring part of the second coil wiring in the axial direction, and when viewed in the axial direction, a protrusion amount of the first pad part from the second wiring part to the inside of the coil is 1.4 times or less of a width dimension of the second wiring part.

2. The inductor component according to claim 1, wherein a length of the via wiring in an extending direction of the coil wiring is longer than a length of the via wiring in a width direction of the coil wiring.

3. The inductor component according to claim 2, wherein a size of the inductor component in a direction parallel to the bottom surface and perpendicular to the axis is less than 0.7 mm, and a size of the inductor component in a direction parallel to the axis is less than 0.4 mm.

4. The inductor component according to claim 2, wherein an inner diameter of the coil increases from a center in the axial direction of the coil toward both ends.

5. The inductor component according to claim 1, wherein a size of the inductor component in a direction parallel to the bottom surface and perpendicular to the axis is less than 0.7 mm, and a size of the inductor component in a direction parallel to the axis is less than 0.4 mm.

6. The inductor component according to claim 5, wherein the protrusion amount is 21 μm or less.

7. The inductor component according to claim 6, wherein a center of the first pad part is located at a center in a width direction of the second wiring part when viewed in the axial direction.

8. The inductor component according to claim 7, wherein a diameter of the first pad part is equal to the width dimension of the second wiring part when viewed in the axial direction.

9. The inductor component according to claim 6, wherein a radius of the first pad part is 18 μm or less when viewed in the axial direction.

10. The inductor component according to claim 6, wherein a center of the first pad part is located at a center in the width direction of the second wiring part when viewed in the axial direction, and a radius of the first pad part is 18 μm or less.

11. The inductor component according to claim 10, wherein the protrusion amount is 10.5 μm or less.

12. The inductor component according to claim 10, wherein the protrusion amount is 9.5 μm or less.

13. The inductor component according to claim 1, wherein an inner diameter of the coil increases from a center in the axial direction of the coil toward both ends.

14. The inductor component according to claim 13, wherein in at least two coil wirings of all the coil wirings, the inner diameter of one coil wiring of the two coil wirings adjacent to each other in the axial direction is larger than the inner diameter of the other coil wiring, and when viewed in the axial direction, a deviation width between an inner surface of the one coil wiring and an inner surface of the other coil wiring is from 1 μm to 4 μm.

15. The inductor component according to claim 14, wherein in all the coil wirings, the inner diameter of the one coil wiring is larger than the inner diameter of the other coil wiring, and when viewed in the axial direction, the deviation width between the inner surface of the one coil wiring and the inner surface of the other coil wiring is from 1 μm to 4 μm.

16. The inductor component according to claim 14, wherein the deviation width in a direction intersecting with the first end surface and the second end surface in a portion of the coil wiring extending in a direction intersecting with the top surface and the bottom surface is larger than the deviation width in a direction intersecting with the top surface and the bottom surface in a portion of the coil wiring extending in a direction intersecting with first end surface and the second end surface.

17. The inductor component according to claim 13, wherein the width dimension of the wiring part of all the coil wirings is the same, the first coil wiring corresponds to a portion having a small inner diameter of the coil, and when viewed in the axial direction, the protrusion amount from the second wiring part of the first pad part to the outside of the coil is greater than or equal to the protrusion amount from the second wiring part of the first pad part to the inside of the coil.

18. The inductor component according to claim 17, wherein the first coil wiring corresponds to a portion having a smallest inner diameter of the coil.

19. The inductor component according to claim 17, wherein the first external electrode is configured from the first end surface to the bottom surface, the second external electrode is configured from the second end surface to the bottom surface, and the first pad part is located on the top surface side relative to the bottom surface side.

20. The inductor component according to claim 19, wherein in the coil wiring located on the outer side in the axial direction among all the coil wirings, the pad part is located on the bottom surface side relative to an end edge on the top surface side of the first external electrode and an end edge on the top surface side of the second external electrode when viewed in the axial direction.

* * * * *